United States Patent
Keeton et al.

(10) Patent No.: US 7,680,635 B2
(45) Date of Patent: Mar. 16, 2010

(54) CONFIGURATION SYSTEM AND METHOD

(75) Inventors: Kimberly Keeton, San Francisco, CA (US); John Wilkes, Palo Alto, CA (US); Cipriano A. Santos, Modesto, CA (US); Dirk Beyer, Walnut Creek, CA (US); Arif Merchant, Los Altos, CA (US); Jeffrey Scott Chase, Durham, NC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1506 days.

(21) Appl. No.: 10/944,321

(22) Filed: Sep. 17, 2004

(65) Prior Publication Data

US 2005/0066239 A1    Mar. 24, 2005

Related U.S. Application Data

(60) Provisional application No. 60/504,230, filed on Sep. 19, 2003.

(51) Int. Cl.
*G06F 7/60* (2006.01)
(52) U.S. Cl. .......................................... 703/2
(58) Field of Classification Search .................. 703/2; 705/35
See application file for complete search history.

(56) References Cited

U.S. PATENT DOCUMENTS

| | | | | |
|---|---|---|---|---|
| 5,428,712 A * | 6/1995 | Elad et al. | ...................... | 706/46 |
| 6,219,650 B1 * | 4/2001 | Friend et al. | .............. | 705/36 R |
| 6,321,317 B1 | 11/2001 | Borowsky et al. | ............ | 711/170 |
| 6,366,931 B1 | 4/2002 | Borowsky et al. | ............ | 707/205 |
| 6,526,420 B2 | 2/2003 | Borowsky et al. | ............ | 707/205 |
| 7,107,191 B2 * | 9/2006 | Stewart et al. | .................. | 703/1 |
| 2004/0193397 A1 * | 9/2004 | Lumb et al. | .................... | 703/24 |
| 2005/0102547 A1 | 5/2005 | Keeton | | |
| 2005/0144114 A1 * | 6/2005 | Ruggieri et al. | ................ | 705/38 |

OTHER PUBLICATIONS

Disaster recovery strategies with Tivoli storage management, 2nd Edition, Nov. 2002, pp. 4, 7, 9, 47, and 311.*
Keeton, Kimberly , et al., "Automatic design of Dependable Data Storage Systems", *To appear in of First Workshop on Algorithims and Architectures for Self-Managing Systems (Self-Manage '03)*, held in FCRC, San Diego, CA, Jun. 2003, 7-12.
Keeton, Kimberly , et al., "Automating Data Dependability", *To appear in 10th ACM-SIGOPS European Workshop*, Saint-Emilion, France, (Sep. 2002).
K. Keeton et al., "Designing for Disasters," Proceedings of the Third USENIX Conference on File and Storage Technologies, pp. 1-15 (Mar. 31-Apr. 2, 2004).

(Continued)

*Primary Examiner*—Paul L Rodriguez
*Assistant Examiner*—Juan C Ochoa

(57) ABSTRACT

A configuration method includes selecting a design configuration, and modeling the solution configuration having a failure event for the selected solution configuration to determine an amount of down time associated with the failure event. A first penalty cost function is applied the amount of down time to determine a first penalty cost associated with the failure event of the selected solution configuration.

55 Claims, 9 Drawing Sheets

OTHER PUBLICATIONS

Alvarez, G.A., et al., Minerva: An Automated Resource Provisioning Tool for Large-scale Storage Systems, HP Labs, Palo Alto, CA, 2001, pp. 1-27.

Anderson, E., et al., Ergastulum: Quickly Finding Near-optimal Storage System Designs, HP Labs, Palo Alto, CA, 2001, pp. 1-14.

Anderson, E., et al., Hippodrome: Running Circles Around Storage Administration, Conference on File and Storage Technologies (FAST'02), pp. 175-188, Monterey, CA, Jan. 28-30, 2002, USENIX, Berkeley, CA.

Avizienis, A., et al., Fundamental Concepts of Dependability, UCLA, Los Angeles, CA, 2000, pp. 1-6.

Brown, A. and Patterson, D.A., Towards Availability Benchmarks: A Case Study of Software RAID Systems, Proceedings of 2000 USENIX Annual Technical Conference, San Diego, CA, Jun. 18-23, 2000, USENIX, Berkeley, CA (15 pages).

Classes of Recovery, CNT, Minneapolis, MN, 2003 (9 pages).

Ji, M., et al., Seneca: Remote Mirroring Done Write, Proceedings of USENIX Technical Conference, San Antonio, TX, pp. 253-268, Jun. 2003, USENIX, Berkeley, CA, pp. 253-268.

Siewiorek, D.P. and Swarz, R.S., Reliable Computer Systems Design and Evaluation, Third Edition, A K Peters, Ltd., Natick, MA, 1998 (3 pages).

Tang, D., et al., Automatic Generation of Availability Models in RAScad, Proceedings of the International Conference on Dependable Systems and Networks (DSN'02), IEEE, 2002 (5 pages).

Wilkes, J. and Stata, R., Specifying Data Availability in Mult-device file systems, Technical Report HPL-SP-90-6, HP Labs, Palo Alto, CA, Apr. 1, 1990, pp. 1-4.

Wilkes, J., Traveling to Rome: QoS Specifications for Automated Storage System Management, Proceedings of the International Workshop on Quality of Service (iWQoS), Karisruhe, Germany, Jun. 2001 (17 pages).

Wylie, J.J., et al., Selecting the Right Data Distribution Scheme for a Survivable Storage System, Report CMU-CS-01-120, Carnegie Mellon University, Pittsburgh, PA, May 2001, pp. 1-21.

Manish Malhotra et al: "Reliability Analysis of Redundant Arrays of Inexpensive Disks", Journal of Parallel and Distributed Computing, 1993, pp. 146-151.

Geist R. et al., "An Analytic Treatment of the Reliability and Performance of Mirrored Disk Subsystems", IEEE 1993, pp. 442-450.

Schulze M. et al.: "How Reliable is a Raid?", Intellectual Leverage, IEEE 1989, pp. 118-123.

* cited by examiner

CONFIGURATION SYSTEM AND METHOD

PRIORITY APPLICATION

This applications claims priority to a provisional application entitled "Method of Automatically Designing Storage Systems to Achieve Data Dependability Goals," filed Sep. 19, 2003, Ser. No. 60/504,230.

BACKGROUND

Hardware breaks. Software has defects. Viruses propagate. Buildings catch fire. Power fails. People make mistakes. Although it is preferred that these events never occur, it is prudent to defend against them. The cost of data unavailability can be large. Many businesses estimate their outage costs as more than $250,000/hour. Others estimate outage costs at more than $ 1,000,000/hour. The price of data loss is even higher. Recent high-profile disasters have raised awareness to plan for recovery or continuity.

A constant challenge is to construct dependable systems that protect data and the ability to access data. Data is an asset to substantially all businesses. Losing information due to various failures can bring a company to its knees—or put it out of business altogether. Such catastrophic outcomes can readily be prevented using various configurations of hardware and software; however, the design space of results, such as solutions, is surprisingly large, and there are a myriad of configuration choices. In addition, the various alternative design choices interact in complicated ways. Thus, results, such as solutions, are often over-engineered or under-engineered, and administrators may not understand the degree of dependability they provide.

It is difficult to combine and configure the building blocks for data protection to create well-engineered data dependability results, such as solutions. Over-engineered results, such as solutions, may incur excessive costs to defend against negligible risks. Under-engineered results, such as solutions, have their own costs in a disaster: crippling outages, loss of critical data, or unacceptably degraded service. Faced with these choices, designers often resort to ad hoc approaches to strike the right balance, guided by rules of thumb and their own limited or even irrelevant experience. When a designer resorts to an ad hoc approach, many potential results may not be considered. Therefore, the selected result may not be as appropriate, well-matched, and/or optimal as when more results are considered.

BRIEF DESCRIPTION OF THE FIGURES

Embodiments of the present invention are illustrated by way of example and not limitation in the Figures of the accompanying drawings in which.

DETAILED DESCRIPTION

Figure 1:
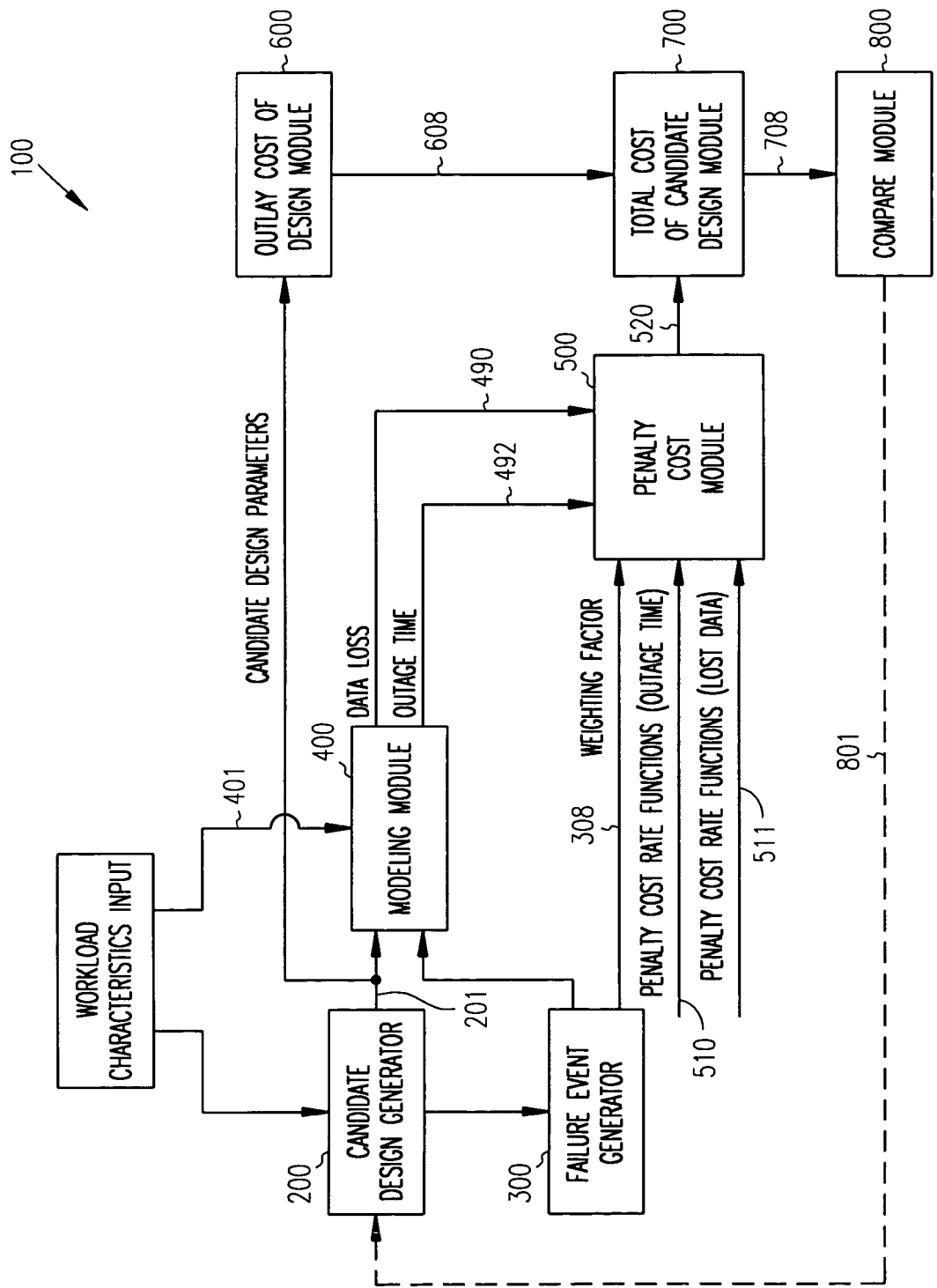
FIG. 1 is a diagram illustrating an overall structure of a configuration result system, according to an example embodiment.

A system and method for selecting configuration results from a plurality of candidate configuration designs are described herein. In the following description, numerous specific details are set forth. The following description and the drawing figures illustrate aspects and embodiments of the invention sufficiently to enable those skilled in the art. Other embodiments may incorporate structural, logical, electrical, process, and other changes; e.g., functions described as software may be performed in hardware and vice versa. Examples merely typify possible variations, and are not limiting. Individual components and functions may be optional, and the sequence of operations may vary or run in parallel. Portions and features of some embodiments may be included in, substituted for, and/or added to those of others. The scope of the embodied subject matter encompasses the full ambit of the claims and substantially all available equivalents.

This description of the embodiments is divided into four sections. In the first section, an embodiment of a system-level overview is presented. In the second section, methods for using example embodiments are described. In the third section, an example implementation is described. In the fourth section, an embodiment of a hardware and operating environment is described.

System-Level Overview

This section provides a system level overview of example embodiments of the invention.

FIG. 1 is a schematic diagram illustrating a configuration result system, such as a configuration solution system 100, according to an embodiment of this invention. The configuration solution system 100 includes candidate design generator 200 communicatively coupled to a failure event generator 300. The configuration solution system 100 also includes a modeling module 400. The candidate design generator 200 and the failure event generator 300 are communicatively coupled to the modeling module 400. The candidate design generator 200 outputs candidate designs to the modeling module 400. As shown in FIG. 1, the candidate design generator outputs a signal 201 that includes the candidate design parameters associated with a candidate design. Workload inputs 401 are input to the modeling module 400. The modeling module 400 models each of the candidate designs from the candidate design generator 200 in various failure modes or during various failure events to produce a recent data loss time output 490 and a recovery outage time output 492 for each failure in a set of failure events input to the modeling module 400 from the failure generator 300. The configuration solution system 100 also includes a penalty cost module 500. The penalty cost module 500 is communicatively coupled to the modeling module 400. The data loss output 490 and a recovery outage time output 492 (also referred to as down time or data recovery time) are output to the penalty cost module 500 for each failure scenario. Also input to the penalty cost module is at least one penalty cost rate function. As shown in FIG. 1, there is a penalty cost rate function 510 associated with outage time and a penalty cost rate function 511 associated with the cost of data loss input to the penalty cost module 500. The penalty cost rate function 510 and the penalty cost rate function 511 are used to determine the total penalty cost for a failure event. In different embodiments the penalty cost rate function 510 and the penalty cost rate function 511 are linear functions, step functions or exponential functions. The step function can be implemented using a table lookup. The determined penalty cost associated with the outage time and the determined penalty cost associated with the data loss are summed to determine the total penalty cost for a specific failure mode. In one example embodiment, the product of the penalty cost rate function (outage time) 510 and the recovery outage time 492, and the product of the penalty cost rate (lost data) 511 and the data loss 490 are summed to produce a total penalty cost for the specific failure mode. The total penalty cost of the specific failure is multiplied by a weighting factor, depicted by a signal 308 from the failure event generator 300. The weighting factor 308 accounts for the importance or likelihood of occurrence of a specific failure mode. The total penalty cost value 520 associated with the specific candidate design is determined by summing the weighted total penalty costs for the various failure events associated with a candidate design.

The configuration result system 100 also includes an outlay cost of design module 600 that is communicatively coupled to the candidate design generator 200. The candidate design generator 200 outputs a signal 201 that includes the candidate design parameters associated with a candidate design to the outlay cost of design module 600. The outlay cost of design module 600 includes costs associated with implementing and maintaining the candidate design. The outlay costs include capital costs for purchasing equipment, software, real estate, and the like. The outlay costs also includes periodic costs, such as rental/leasing costs for equipment or real estate, power and air conditioning bills, salaries of system administrators, and insurance premiums to protect against data loss or outages. The outlay costs can be determined on a yearly basis which would consider the depreciation of capital costs such as for purchasing hardware or software. If outlay costs are annualized, the weighting factors for various failure modes are also set for the probability of failure within a year. In other embodiments, the outlay costs and the weighting factors, represented by the signal 308, can be set for outage time periods such as the life of the particular candidate design. The outlay cost is output 608 to a total cost of a result module, such as a solution module 700. The total cost of solution module 700 receives the outlay cost of the candidate design 608 generated by the candidate design generator 200, the value of the sum of the weighted total penalty costs for multiple failure modes 520 as inputs. The total cost of solution module 700 sums the value of the sum of the weighted total penalty costs for multiple failure modes 520 and the total outlay cost 608 to yield the total cost of the candidate design 708.

For each candidate design, the total cost of the candidate design is stored and compared at a compare module 800. The compare module 800 stores the total cost of the candidate design 708 and an identifier for each of the candidate designs generated by the candidate design generator 200. In the compare module 800, the total cost of each of the candidate designs are compared. In one embodiment, several of the candidate designs and the related total costs are selected for presentation as a candidate solution configuration, such as a candidate design and/or a design configuration and/or a result configuration. In another embodiment, the candidate design generated that has the least total cost is selected and presented as the result configuration, such as the solution configuration. Also included is a feedback signal 801 that includes information regarding unselected candidate design configurations. The feedback signal 801 is input to the candidate design generator module 200 and the information is used in selecting future candidate designs. The information of the feedback signal 810 can be used to prune future candidate designs thereby making the search for candidate designs more efficient when compared to an exhaustive search or other types of searches. As shown, alternative candidate designs are enumerated, completely evaluated and compared on the basis of total cost, and feedback is provided to the candidate design generator.

In another example embodiment, certain techniques, such as mathematical programming, provide a tighter coupling between the candidate generation, evaluation and comparison. These techniques permit elimination of candidate designs as a minimal cost solution based on a partial evaluation of a candidate design. As a result, feedback can be input to the candidate design generator 200 without having the complete evaluation of the candidate design. This process efficiently explores the space of candidate designs without enumerating and evaluating substantially all potential candidate designs. These approaches are merely two example embodiments. Other approaches for determining feedback 801 are also contemplated.

In another embodiment, the output of the total cost of solution module 700 is a parametric model description, including a set of designs, a set of failure events and a description of the total cost as a function of the design parameters and failure event parameters. For instance, this parametric model description can be provided in the form of a mathematical program, including a set of decision variables, a set of constraints and an objective function. In this embodiment, the candidate design generator 200, failure event generator 300, modeling module 400, workload characteristics input, penalty cost module 500, outlay cost module 600 and total cost module 700 determine the appropriate parameterization for the model description. In this embodiment, the functionality of the compare module 800 can be provided by a solver such as the CPLEX solver, available from ILOG, Inc., 1080 Linda Vista Avenue, Mountain View, Calif. USA. The product name is ILOG CPLEX.

As shown, each of the modules discussed above can be implemented in software, hardware or a combination of both hardware and software. Furthermore, each of the modules can be implemented as an instruction set on a microprocessor associated with a computer system or can be implemented as a set of instructions associated with any form of media, such as a set of instructions on a disk drive, a set of instructions on tape, a set of instructions transmitted over an Internet connection or the like.

METHODS OF EMBODIMENTS

This section describes methods performed by embodiments of the invention. In certain embodiments, the methods are performed by machine-readable media (e.g., software), while in other embodiments, the methods are performed by hardware or other logic (e.g., digital logic). In this section, FIGS. 2-8 will be discussed.

Figure 2:
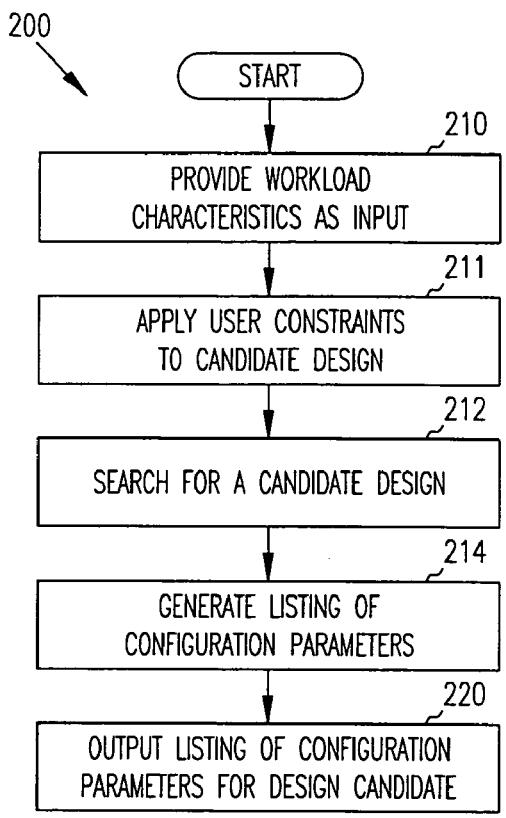
FIG. 2 is a flow diagram illustrating a method for generating candidate designs, according to an example embodiment.

FIG. 2 is a flow diagram illustrating a method for generating candidate designs, according to an example embodiment of the invention. Candidate designs include one or more potential design mechanisms.

The method 200 includes providing workload characteristics as input, as depicted by reference numeral 210. In one example, the candidate design is sensitive to the characteristics of a storage workload. For example, many data protection schemes are sensitive to the average update rate: the volume of updates over a given interval, divided by the interval length. Techniques that accumulate modifications over an interval, such as incremental tape backup, are more sensitive to the workload's update rate. The update rate may include the number of substantially unique data items written over an interval. Longer accumulation intervals allow more time for overwrites, so they often have lower update rates. This rate can be modified by a series of tuples of the form <interval duration, update rate>. Synchronous mirroring results or solutions are also sensitive to the short-term peak-to-average burstiness of writes, which can be 3-10× the long term average update rate. Workload characteristics that do not affect the choice of dependability results, such as solutions, may be ignored.

Workload characteristics can be measured from an existing system or estimated by a person or a tool from a repertoire of known workloads to characterize the workloads. Existing tools that can be used to characterize workloads include I/O tracing tools like HP-UX's MeasureWare midaemon™, and similar facilities provided by other operating systems. These traces can then be further mined to determine the workload attributes described above using tools such as HP's GlancePlus™ product.

The method 200 also includes applying user constraints to the design candidates, as depicted by reference numeral 211. In some example embodiments, the constraints are based on user-specifications. The actual mechanism can be implicitly or explicitly limited by the user, the system design, the specifications, or other constraints. Some of the explicit limitations include user specifications such as use of a certain type of software or hardware for a particular system. For example, a particular corporate user may specify use of certain brands of hardware or software for business reasons. Additionally, regulatory specifications for data retention and deletion may be explicitly expressed. Candidate designs may be applicable to any type of system including computer storage systems, databases, wide-area links, or the like.

In generating one or more candidate designs, a search for candidate designs may be conducted, as depicted by reference numeral 212. A multiplicity of techniques can be used to search for candidate designs. Examples include exhaustive searches, first fit (also known as a greedy) search, or best fit search. In some embodiments, randomized search algorithms, such as simulated annealing, genetic algorithms or taboo search, may be used. Also included are searches that employ mathematical programming techniques such as integer, linear or non-linear programming; a CPLEX solver or Excel solver can also be used. As mentioned above, some searches employ a feedback loop in order to prune certain branches of the search (see feedback signal 801 in FIG. 1). Some search results are not viable candidate designs and so the non-viable candidate designs can be used to eliminate other candidate designs that also would not be viable. This list of examples is not meant to be exhaustive. Other sources of candidate designs or other types of candidate designs can also be used.

Once a candidate design is found, a listing of substantially all configuration parameters associated with the candidate design is generated, as depicted by reference numeral 214. The configuration parameters are a listing of substantially all resources specified for a design candidate, as well as a listing of the software configuration parameters describing the operation of the data protection techniques employed in the candidate design (e.g., the duration of a full backup window). The configuration parameters for a design candidate are output to the modeling module 400 and the outlay cost module 600, as depicted by reference numeral 220. In some embodiments, the configuration parameters are also provided with an identifier for the particular design candidate.

Figure 3:
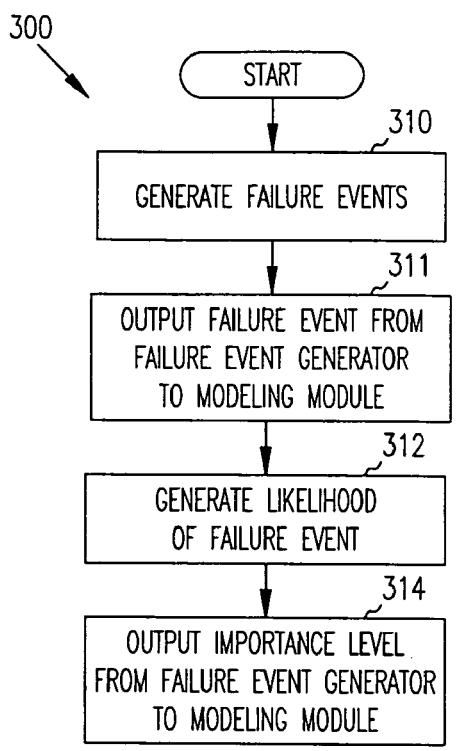
FIG. 3 is a flow diagram illustrating a method for generating failure events, according to an example embodiment.

FIG. 3 is a flow diagram illustrating a method 300 for generating failure events, according to an example embodiment. Initially, various failure events associated with the candidate design are considered, as depicted by reference numeral 310. A failure event signal is output from the failure event generator to the modeling module, as depicted by reference number 311. Failures may be explicitly specified or implicitly defined. A likelihood of the failure can be associated with each failure 312. The likelihood is based on the probability of that failure within a time frame, such as a year or the life of the candidate. The likelihood may also be reflective of the importance associated with the particular failure mode. In some embodiments, the likelihood of the failure can also be a default listing. In some embodiments, the user has the opportunity to override default occurrence probabilities to update them for their particular site and/or situation by designating an importance level 314 for a failure event. For example, if the computer system is situated in Minnesota, the likelihood of a catastrophic failure due to a hurricane is substantially non-existent. The user may also treat the likelihood as an importance level, to reflect their degree of risk aversion for a particular failure event (e.g., floods may be very important to protect against if in the past the administrator lost his/her job for failing to protect against a flood).

Failures may cause the loss of data (e.g., the primary copy or one or more secondary copies) and/or the loss of data accessibility. Failures may affect the primary site, one or more secondary sites or the whole system. Failures include hardware failures, environmental failures and disasters. Hardware failures include failures of disk drives, I/O controllers, memory, processors or power supplies. Environmental failures include power failures and any air conditioning or site shortcomings that could affect the system. Disasters include fires, floods, earthquakes, hurricanes and blizzards, or the like. Other failures that are considered include software failures, such as application failures, operating system failures, device firmware failures, virus infections and redundancy-technique failures. Still other failures considered in some embodiments are human errors, which include administrator errors, operator errors and end-user errors. After generating failures 310 and their probability 312 and then adjusting the importance level 314, the information or data is output from the failure event generator to the penalty cost module, as depicted by reference numeral 334. The actual signal from the failure event generator 300 to the penalty cost module is depicted by reference number 308 (shown in FIG. 1).

In some embodiments, multiple failure events are handled for each candidate design, with each failure event resulting in its own outage time and data loss metrics. As will be described in more detail in FIG. 5, the outage time penalty and data loss penalty are calculated by applying one or more associated penalty rate functions. The total penalties for a failure scenario are then weighted by applying the penalty cost function of each failure scenario associated with a candidate design by the likelihood/importance of that failure scenario.

Figure 4:
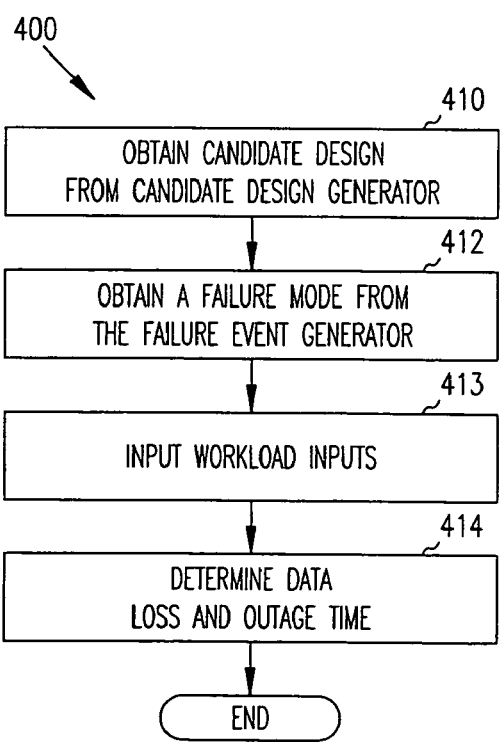
FIG. 4 is a flow diagram illustrating a method for modeling to predict outage time and recent data loss, according to an example embodiment.

FIG. 4 is a flow diagram illustrating a method 400 for modeling to predict outage time and recent data loss, according to an embodiment of the invention. Initially, the candidate design is obtained from the candidate design generator, as depicted by reference numeral 410. A failure mode or failure event is also obtained from the failure event generator, as depicted by reference numeral 412. It should be noted that a single failure may be evaluated or a number of failures may be modeled for a particular candidate design. In addition, workload characteristics are input to the modeling module, as depicted by reference numeral 413. The modeling module then uses the information associated with the candidate design and related to the failure event obtained from the failure generator to determine an outage time (down time) and recent data loss for the candidate design 414. Determining data loss and outage time, as depicted by reference numeral 414, includes running a set of predictive mathematical model algorithms that take model inputs and estimate model outputs. The model outputs are the data loss 490 and the outage time of the system 492 for a particular failure. In some embodiments, a set of failure-specific estimates for a particular candidate design or system is output from the modeling module. The algorithms that can be used to produce such estimates include basic equations such as polynomial, linear, exponential, curve-fit and non-linear equations, as well as Markov models. Performability models, self-adjusting models and table-based or interpolation models can also be used as part of an algorithm to take model inputs and estimate the outputs of the model.

In some embodiments of the invention, various failure events may also be accompanied by the likelihood of that failure. This is used to weight the various failure scenarios, with respect to the other failures so that a total for a particular candidate design can be predicted. If all failure modes have been modeled for a particular candidate design, then the process within the modeling module 400 for the specific candidate design is ended.

Figure 5A:
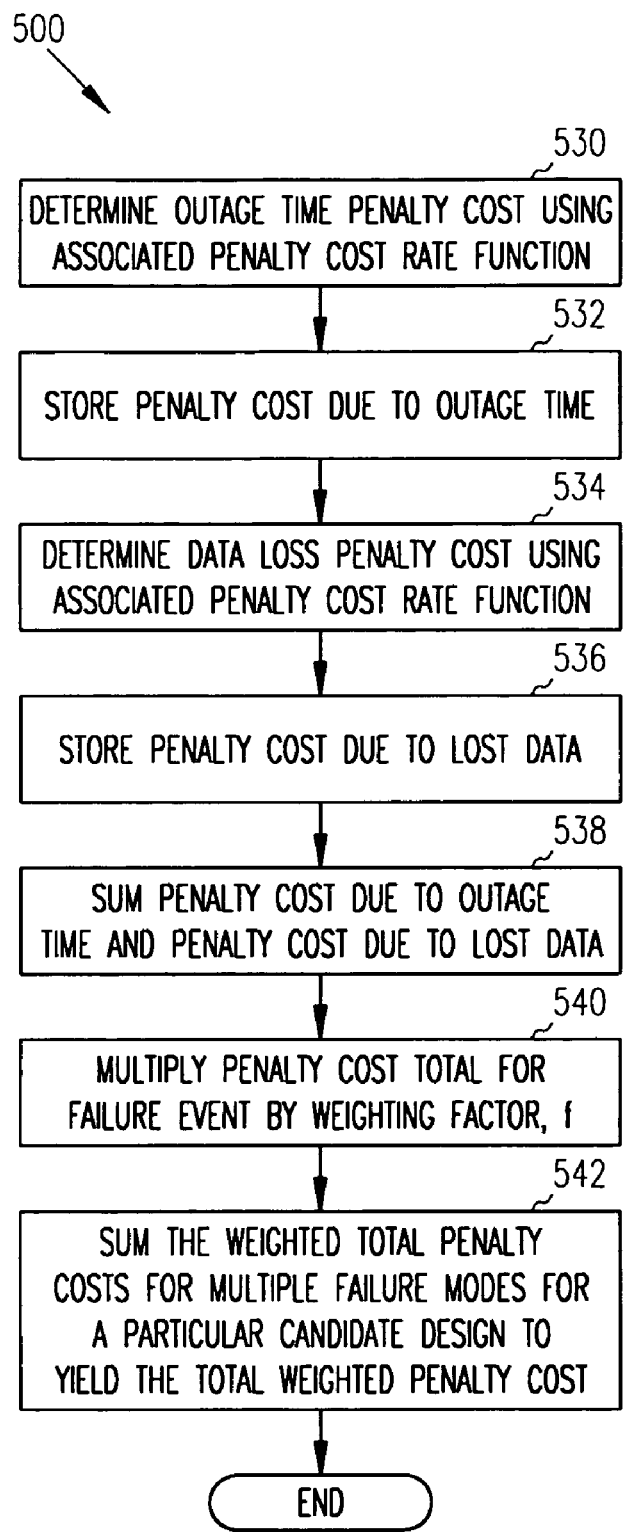
FIG. 5A is a flow diagram illustrating a method for determining penalty costs associated with a selected candidate configuration result, according to an example embodiment.
Figure 5B:
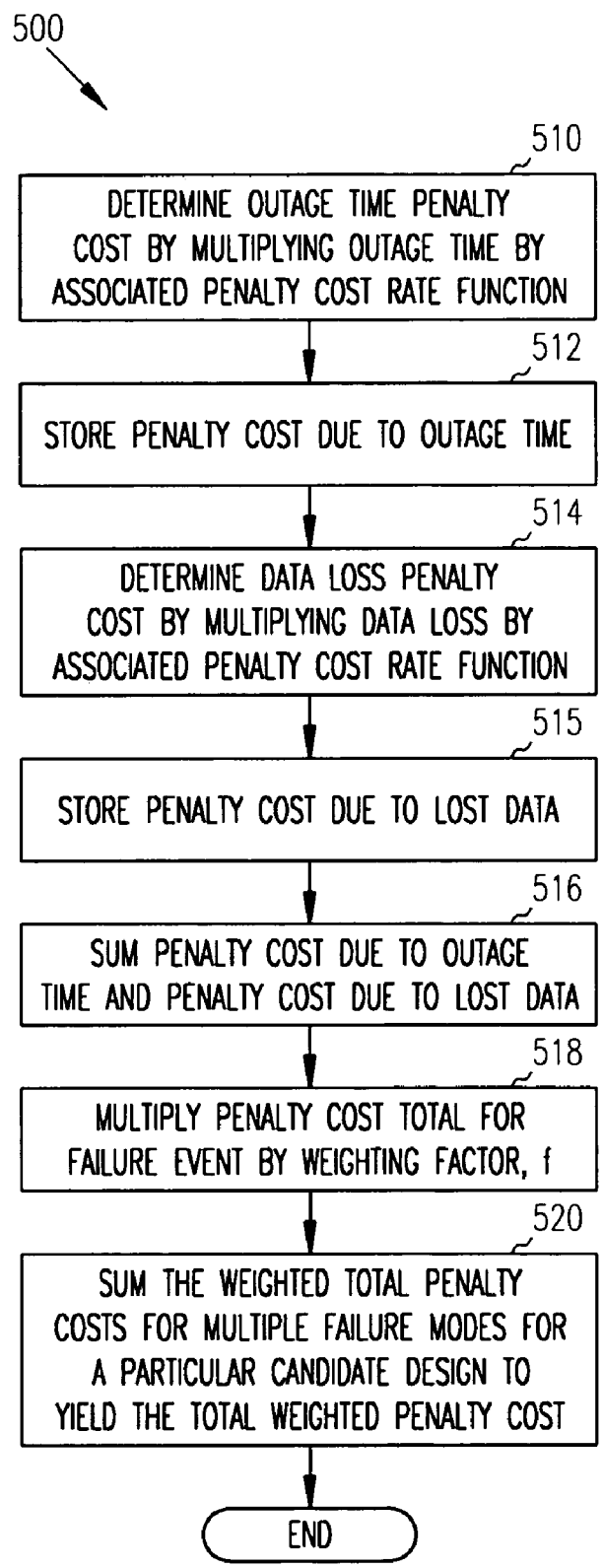
FIG. 5B is a flow diagram illustrating a method for determining penalty costs associated with a selected candidate design, according to an example embodiment.

FIGS. 5A and 5B are flow diagram of a method 500 for determining a penalty cost associated with a selected candidate design, according to example embodiments. In one embodiment, the user defines at least one penalty cost rate rather than specifying specific restrictions for candidate design generated by the solution generator 200 (shown in FIG. 1). In another embodiment of the invention, there is a first penalty cost rate associated with outage time (down time) and a second penalty cost rate associated with the amount of lost data. In one embodiment of this invention, the user merely states the amount of revenue lost per hour or per minute or per day due to outage time of a system. An amount of lost revenue is also associated with units of lost data. The system outage time may have a different penalty cost rate than the rate for a lost amount of data.

Penalty rates can include direct penalties from lack of data integrity and data inaccessibility as well as indirect penalties such as lost consumer confidence and lost worker productivity. The penalty rates for outage time may be a function of whether the system is up or down, or they can be a function of the performance level that is achieved. The penalty costs can be linear or non-linear, continuous or discontinuous functions. In some embodiments, the functions can be monotonically increasing as the amount of data or outage time increases. In some embodiments, the penalty assessed may be a function of cyclic or seasonal behavior. For example, if data is lost during a peak acquisitional time, the penalty cost is higher in some embodiments. In addition, system outage times that occur during a peak time may also have higher initial penalty rates. In short, penalty cost rates can be distributed in many different ways, substantially all of which are contemplated by embodiments.

According to FIG. 5A, the method 500 for determining the penalty cost of a particular failure for a candidate design includes determining an outage time penalty cost by applying the a related penalty cost rate function to the outage time determined by the modeling module, as depicted by reference numeral 530. The penalty cost due to the outage time is then stored, as depicted by reference numeral 532. The penalty cost for the lost data for a particular failure for a candidate design is determined by applying the related penalty cost rate function to the amount of lost data predicted by the modeling module, as depicted by reference numeral 534. The penalty cost due to the lost data for a particular failure is then stored, as depicted by reference numeral 536. The penalty cost due to outage time and the penalty cost due to lost data are then summed, as depicted by reference numeral 538. The sum of the penalty cost due to outage time and the penalty cost due to lost data is the total penalty cost for a failure event. The total penalty cost for a failure event is then multiplied by weighting factor, f, as depicted by reference numeral 540. The weighting factor represents a probability of a failure event occurrence. The product produces a weighted penalty cost for the failure event. This process is repeated for each failure possibility in a multiple failure modeling process. This results in a plurality of weighted penalty costs for each of the failure events considered by the model. In other words, each weighted penalty cost is a portion of costs attributable to a specific failure for a candidate design. The plurality of weighted penalty costs are then summed to yield a total weighted penalty cost associated with a candidate design, as depicted by reference numeral 542.

FIG. 5B is one embodiment of the method 500 for determining the penalty cost of a particular failure for a candidate design. The method 500 includes multiplying an outage time penalty cost by a related penalty cost rate function, as depicted by reference numeral 510. For example, if the penalty cost rate function is linear with respect to the duration of the outage time, this process involves multiplying the outage time by the penalty cost rate. The penalty cost due to the outage time is then stored, as depicted by reference numeral 512. The penalty cost for the lost data for a particular failure for a candidate design is multiplied by the related penalty cost rate, as depicted by reference numeral 514. The penalty cost due to the lost data for a particular failure is then stored, as depicted by reference numeral 515. The penalty cost due to outage time and the penalty cost due to lost data are then summed, as depicted by reference numeral 516. The sum of the penalty cost due to outage time and the penalty cost due to lost data is the total penalty cost for a failure event. The total penalty cost for a failure event is then multiplied by weighting factor, f, as depicted by reference numeral 518. The weighting factor represents a probability of a failure event occurrence. The product produces a weighted penalty cost for the failure event. This process is repeated for each failure possibility in a multiple failure modeling process. This results in a plurality of weighted penalty costs for each of the failure events considered by the model. In other words, each weighted penalty cost is a portion of costs attributable to a specific failure for a candidate design. The plurality of weighted penalty costs are then summed to yield a total weighted penalty cost associated with a candidate design, as depicted by reference numeral 520.

Mathematically the total penalty cost for design candidate d can be expressed as follows:

$$TotalPenaltyCost_d = \sum_{failure\ events\ f} importanceLevel_f * (dataOutagePenaltyRate * outageTime_{d,f} + dataLossPenaltyRate * dataLossTime_{d,f})$$

Here, the importanceLevel represents the weight for failure f, and the dataOutagePenaltyRate and dataLossPenaltyRate represent linear penalty rate functions. The last two terms may be functions of duration. Other user specifications, such as performability specifications that describe acceptable levels of degraded mode performance, can also be handled by the setting of penalty cost rates for outage time. In this case, the data outage penalty rate is a function of the level of achieved performance (e.g., 0%, 50% or 100% of normal mode performance). The penalty cost function can be linear or non-linear, continuous or discontinuous.

Figure 6:
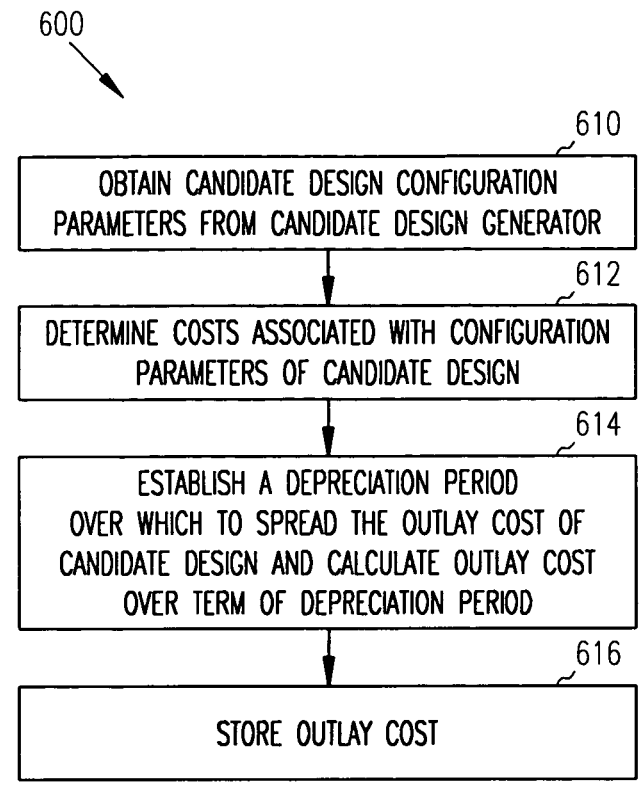
FIG. 6 is a flow diagram illustrating a method for determining an outlay cost associated with a selected candidate design, according to an example embodiment.

FIG. 6 is a flow diagram illustrating a method 600 for determining an outlay cost associated with the selected candidate design, according to an example embodiment. Initially, the configuration parameters for the candidate design generated by the candidate design generator are obtained, as depicted by reference numeral 610. The costs associated with the configuration parameters of the candidate design are determined, as depicted by reference numeral 612. Outlay costs include equipment and facilities outlays for the local site and any remote sites of the candidate design. These costs include hardware and equipment purchase prices, facilities purchase and leasing prices, and service costs. Software outlays, such as licensing fees for software applications and operating systems are also considered when applicable to a particular candidate design configuration. Costs also include personnel outlays, such as employee salaries and other overhead factors associated with personnel for maintaining or managing a portion of a candidate configuration. Costs may also include payouts to customers of the system for violations of their performance, availability, or reliability service level agreements ("SLA"). Costs also include insurance costs, including initial outlays for insurance premiums and deductibles. Insurance can also include a negative outlay or payout when a sum is paid in the event of a failure. The costs should be calculated for a specific period of time, the depreciation period. In one embodiment, the time period established is one year, in which case the costs are annualized and capital costs are depreciated. In other embodiments, other time periods are selected including the lifetime of the system. The outlay cost of the candidate design is computed by establishing a depreciation period over which to spread the outlay cost of a selected the candidate design and calculating the outlay cost over the term of the depreciation period, as depicted by reference numeral 614. The outlay cost is stored for further use, as depicted by reference number 616.

Figure 7:
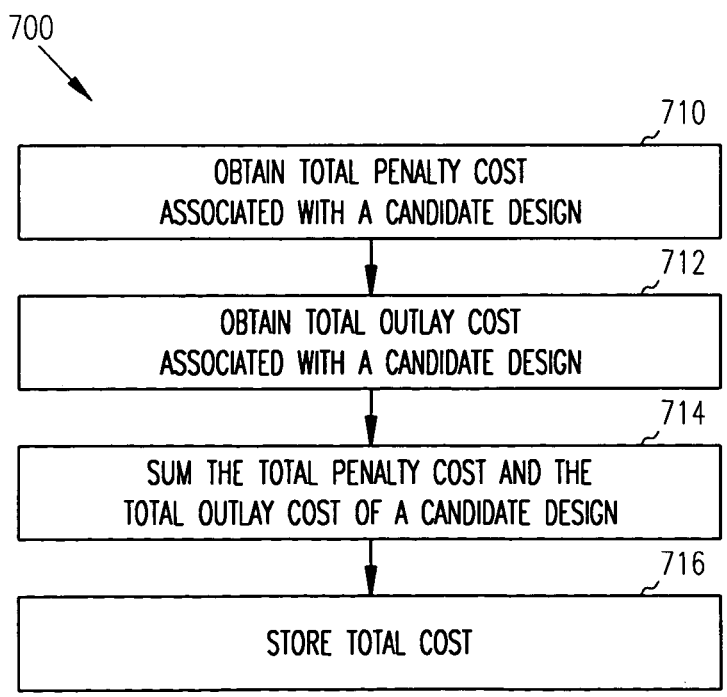
FIG. 7 is a flow diagram illustrating a method for determining a total cost associated with a selected candidate design, according to an example embodiment.

FIG. 7 is a flow diagram illustrating a method 700 for determining a total cost associated with the selected candidate design, according to an example embodiment. Initially, the total weighted penalty cost (the sum of the weighted penalty costs for the multiple failure modes for a candidate design) associated with a candidate design is obtained, as depicted by reference numeral 710. The total outlay cost associated with the same candidate design is also obtained, as depicted by reference numeral 712. Next, the total weighted penalty cost and the total outlay cost related to the candidate design are summed, as depicted by reference numeral 714. The total cost of the candidate design is stored as depicted by reference number 716.

Figure 8:
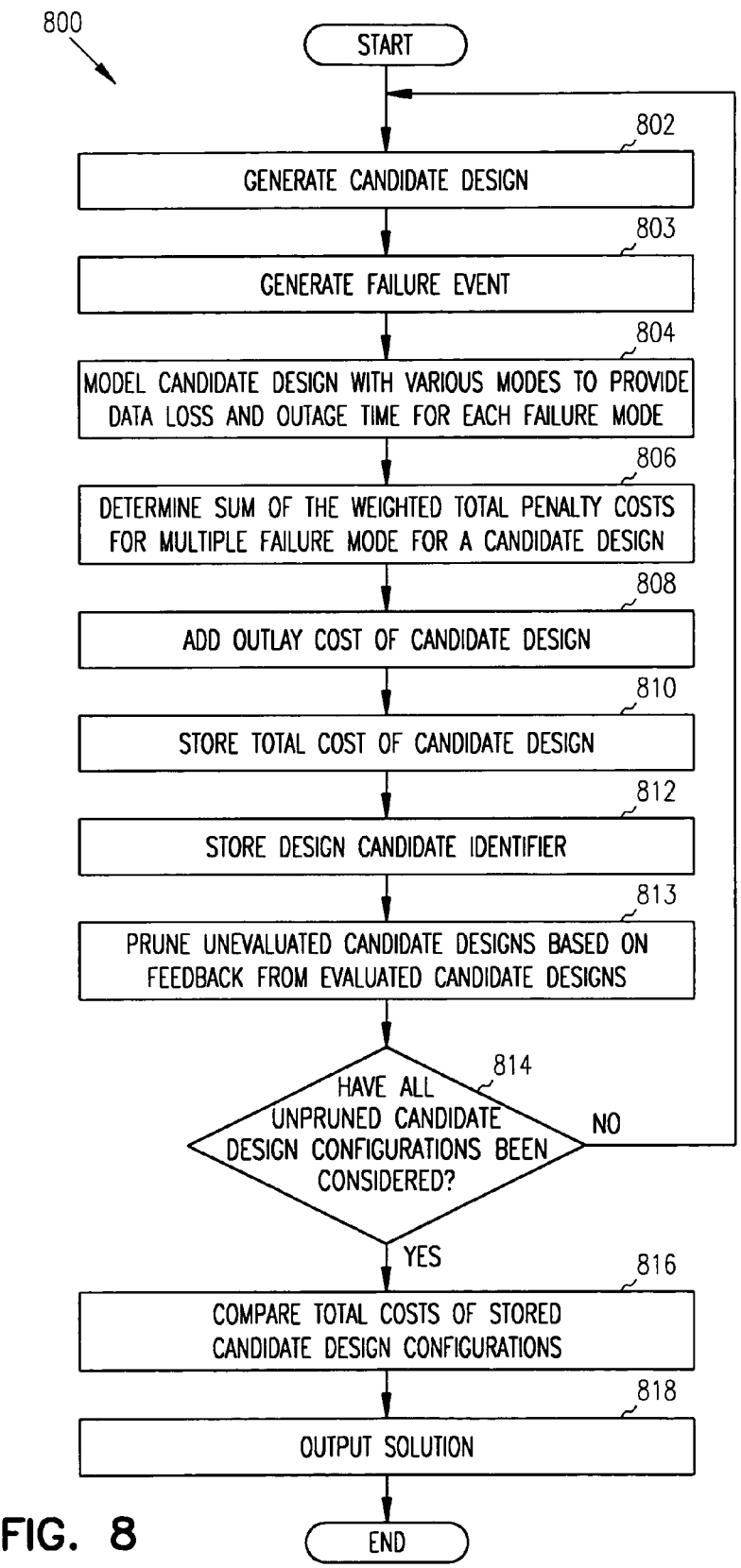
FIG. 8 is a flow diagram illustrating a method for comparing a plurality of candidate designs, according to an example embodiment.

FIG. 8 is a flow diagram illustrating a method 800 for comparing a plurality of candidate designs, according to an example embodiment. A candidate design is generated, as depicted by reference numeral 802. A failure event is also generated as depicted by reference numeral 803. The candidate design is modeled to produce data loss and outage time for each failure mode, as depicted by reference numeral 804. The weighted total penalty costs for the plurality of failure modes for a candidate design are summed, as depicted by reference numeral 806. The outlay cost is added to the weighted total penalty costs of the candidate design, as depicted by reference numeral 808. This yields the total cost of the identified design candidate. The total cost of the identified candidate design is also stored, as depicted by reference numeral 810. A candidate design identifier associated with a specific design candidate is also stored, as depicted by reference numeral 812. Candidate designs that have yet to be evaluated can be pruned based on feedback from evaluated design candidates, as depicted by reference number 813.

As mentioned in the discussion of FIG. 1, a feedback signal 801 that includes information regarding evaluated but unselected candidate designs is input to the candidate design generator module. The information is used in selecting future candidate designs or to prune future candidate designs to make the search for candidate designs more efficient when compared to an exhaustive search or other types of searches. In one embodiment, candidate designs are enumerated, completely evaluated and compared on the basis of total cost, and feedback is provided to the candidate design generator. In another example embodiment, certain techniques, such as mathematical programming, provide a tighter coupling between the candidate generation, evaluation and comparison. These techniques permit elimination of candidate designs as a minimal cost selected result based on a partial evaluation of a candidate design.

Next, a decision is made as to whether substantially all of the candidate designs generated by the candidate design generator have been considered, as depicted by decision box 814. If they have not, then a new candidate design is generated and evaluated with a plurality of failure events to determine its total cost. In other words, operations 802, 803, 804, 806, 808, 810, 812 and 813 are repeated. If substantially all of the candidate designs have been considered, the total costs of the stored candidate designs are compared, as depicted by reference numeral 816 and one or more of the top candidates are output, as depicted by reference numeral 818. In one embodiment, the selected result, such as the output solution 818, includes a design candidate having the minimum total cost of substantially all the candidate designs evaluated. In other embodiments of the invention, the output solution 818 includes a set of a plurality of the least costly candidate designs.

Figure 9A:
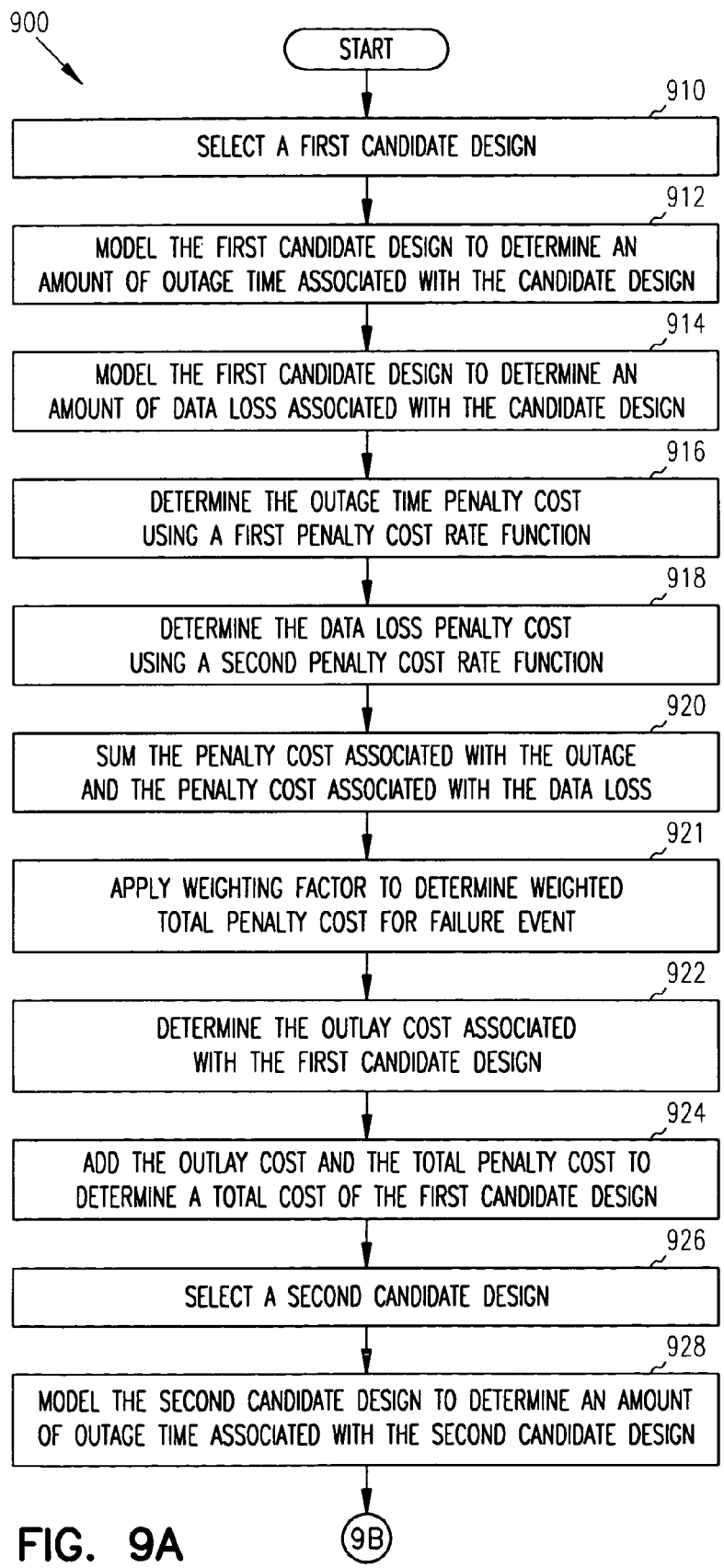
FIGS. 9A and 9B are a flow diagram illustrating the overall operation of a method for selecting configuration results from a plurality of candidate designs, according to an example embodiment.
Figure 9B:
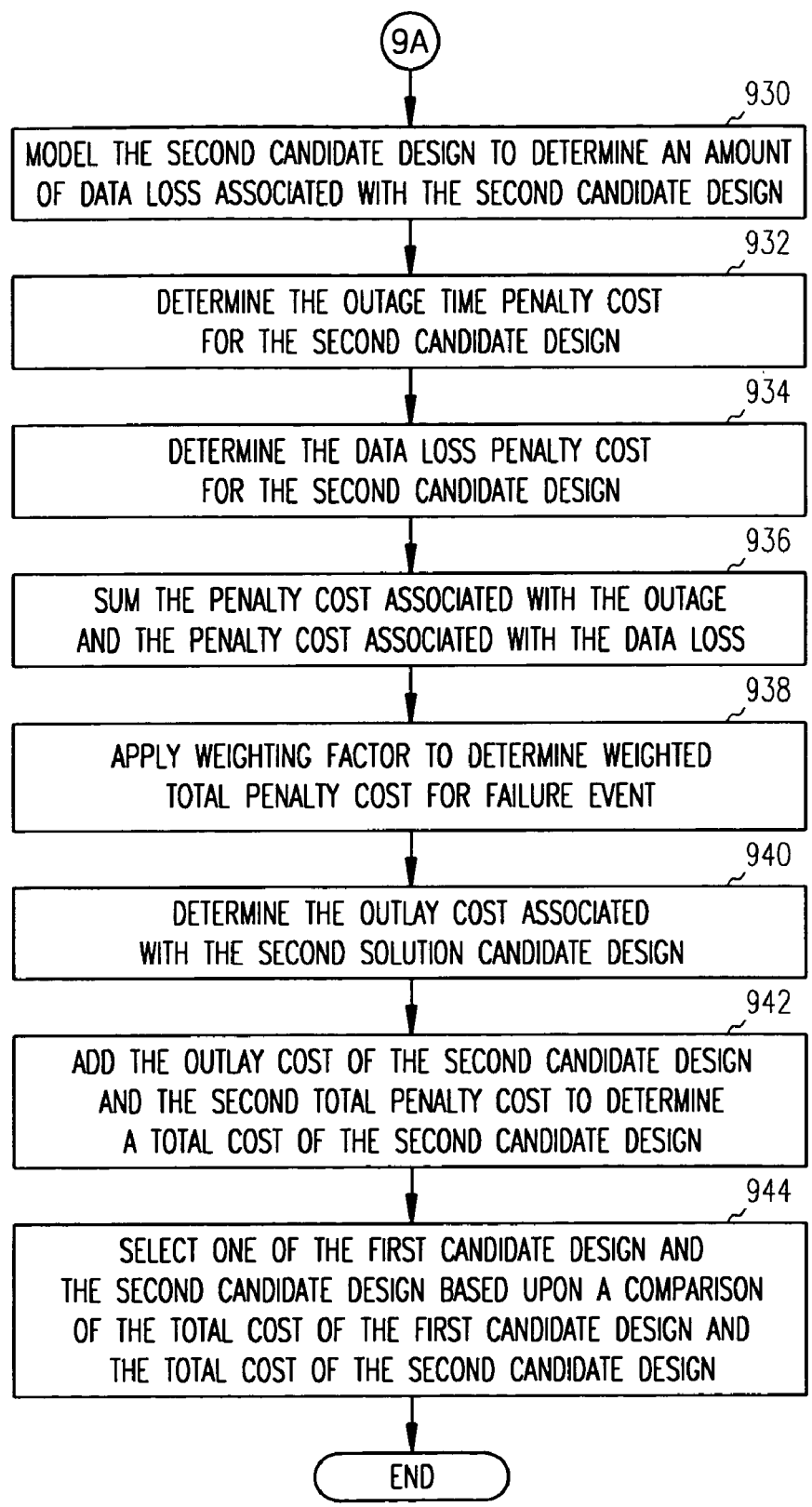

FIGS. 9A and 9B are a flow diagram illustrating the overall operation of a method 900 for selecting configuration results, such as solutions, from a plurality of candidate designs, according to example embodiments of the invention. The configuration method 900 includes selecting a first candidate design 910, and modeling the first candidate design to determine an amount of outage time associated with the candidate design 912, and modeling the first candidate design to determine an amount of data loss associated with the candidate design 914. The configuration method 900 also includes applying a first penalty cost function for outage time to determine the outage time penalty cost 916 and applying a second penalty cost function for data loss to determine a data loss penalty cost associated with the candidate design 918. The total penalty cost for a particular failure event associated the candidate design is found by summing the penalty cost associated with the system outage time and the penalty cost associated with the lost data, as depicted by reference numeral 920. The total penalty cost is then scaled by multiplying it by the associated failure weighting factor to determine weighted penalty cost for a failure event 921. In some embodiments, the failure weighting factor is related to the probability of a failure event happening over the life of the candidate design, or a selected time period, such as a year or number of years. In other embodiments, the failure weighting factor may be 1.0. In one embodiment, where the failure weighting factor is 1.0 is where the probability of one failure event is equally probable as another failure event. The outlay cost associated with the first candidate design is determined 922. The outlay cost is added to the total penalty cost to determine a total cost of the first candidate design 924. In some embodiments, the total cost of the first candidate design includes a summation of a plurality of weighted total penalty costs associated with the first candidate design.

The method 900 also includes selecting a second candidate design 926, and modeling the second candidate design to determine an amount of outage time associated with the second candidate design 928. The method 900 also includes modeling the second candidate design to determine an amount of data loss associated with the second candidate design 930. The outage time penalty cost for the candidate design is determined by applying a first penalty cost function for outage time 932, and the data loss penalty cost is determined by applying a second penalty cost function for data loss 934. The outage time penalty cost and data loss penalty cost are summed to determine a total penalty cost associated with the second candidate design 936. The total penalty cost is then scaled by applying a weighting factor to the associated failure event to determine weighted penalty cost for a failure event 938. In some embodiments, the failure weighting factor is related to the probability of a failure event happening over the life of the candidate design, or a selected time period, such as a year or number of years. In other embodiments, the failure weighting factor may be 1.0. In one embodiment, where the failure weighting factor is 1.0 is where the probability of one failure event is equally probable as another failure event. The method 900 further includes determining the outlay cost associated with the second candidate design 940 and adding the outlay cost and the total penalty cost to determine a total cost of the second candidate design 942. The method 900 also includes selecting one of the first candidate design and the second candidate design based upon a comparison of the total cost of the first candidate design and the total cost of the second candidate design 944. In some embodiments, the method further includes the selection of one of the first candidate design and the second candidate design based upon the candidate design having the least total cost.

The configuration method 900 can be applied to any system, including but not limited to selecting a storage configuration, selecting a hardware configuration, or selecting a software configuration. In one embodiment, the penalty cost rates are associated with data dependability specifications of a system. In some embodiments, the penalty cost rates are obtained from the user. Generally, the user is the one who can accurately supply this information; however, estimates can be based on libraries of penalty rates for different industry segments.

EXAMPLE EMBODIMENT

The Mathematical Optimization Model

This section presents an example embodiment of the method by formulating in detail a mathematical programming optimization model of a dependability design tool. The formulation is a mixed integer program (MIP), and defines the decisions to be made, input data and their functional relationship with these decisions, and an objective function to optimize. Thus, the MIP formulation presented in this section encompasses the following sections:
Sets and indices
Parameters and derived parameters
Decision variables and derived (state) variables
Objective function
Constraints The design tool invokes a set of models for data protection and recovery alternatives to explore the result space, such as the solution space—including the ranges of parameter settings for each technique—and to predict the deployment outlays, worst-case recovery time, and worst-case data loss for each candidate design. This formulation considers remote mirroring using synchronous and asynchronous protocols, and tape backup with remote vaulting. Recovery is accomplished through reconstructing the lost data at the primary site. Each model defines a set of input parameters and their values, a set of output parameters and their ranges of valid settings, and equations relating the parameters to the measures of interest. Different system components may be modeled by supplying different model parameters and new data protection techniques may be incorporated through the addition of new models.

Sets and Indices

To reduce the search space, the values of certain continuous parameters, such as backup intervals and the batch intervals for the batched asynchronous remote-mirroring scheme, are quantized. The following sets enumerate the quantized values.

$m \in M = \{sync, async, asyncB\}$: mirroring type, where sync means synchronous mirroring, async means write-order preserving asynchronous mirroring, and asyncB means batched asynchronous mirroring with write absorption.

$w \in W = \{1 \text{ min}, 5 \text{ min}, 1 \text{ hr}, 4 \text{ hr}, 12 \text{ hr}, 24 \text{ hr}, 48 \text{ hr}\}$: time interval (window) type; used for data protection techniques that accumulate updates over an interval.

$k \in K = \{cycle0, cycle6, cycle13, cycle27\}$: backup cycle types, where cycle0 means full backups are done, cycle6 means a full backup followed by 6 incremental backups, cycle13 means a full backup followed by 13 incremental backups, and cycle27 means a full backup followed by 27 incremental backups. (For a 24-hour window, these cycles correspond roughly to weekly, bi-weekly and monthly full backups, interspersed with incrementals.)

$s \in S = \{hot, unconfig, occupied, occUnconfig, none\}$: status type of spare resources, where hot means resources are ready to be used, unconfig means resources are to be configured, occupied means negotiations are performed to release resources from other tasks and the resources are to be scrubbed, occUnconfig means resource release are negotiated and resources are scrubbed and configured, and none means no spare resources are available.

f∈FailureScopes={array,site}: failure scopes, where array means the failure of the array(s) storing the primary copy of the data set, and site means a site disaster at the primary copy site.

Parameters and Derived Parameters

Parameters represent the input data, and derived parameters are computed from the input data. Fundamental units are indicated for each parameter in parentheses (e.g., US dollars ($), bytes (B), seconds (s), or years (yr) for cost). These values may be expressed in alternate units (e.g., gigabytes (GB) or hours (hr)) for convenience.

Business Specifications Parameters

Business continuity practitioners currently use two metrics to capture data dependability objectives:

1. Recovery time. The Recovery Time Objective (RTO) specifies the maximum tolerable elapsed time between a failure and the point at which application service is restored. The RTO can range from seconds to days.

2. Data loss. Recovery may include reverting to some consistent point prior to the failure, resulting in the loss of updates after that point. The Recovery Point Objective (RPO) gives the maximum allowable time window for which recent updates may be lost. The RPO can range from zero (no loss is tolerable) to days or weeks.

This formulation quantifies the financial impacts of outages and data loss as penalty rates, expressed as $/hour. The loss penalty rate specifies the cost per hour of updates lost. The outage penalty rate specifies the cost per hour of service interruption. The design tool uses these rates to balance expected failure impacts against outlays to arrive at a cost-effective result, such as a cost-effective solution. The tool can be used with a combination of target RTO and RPO values plus penalty rates that are incurred for violations of these targets, or it can be run with the penalty rates alone, in which case it identifies the worst-case recovery time and data loss as a side effect of this design process.

targetRPO: target recovery point objective(s). This parameter may be set explicitly, to provide the traditional business continuity RPO, or set to zero, to permit the solver to identify the worst-case recent data loss as a side effect.

targetRTO: target recovery time objective(s). This parameter may be set explicitly, to provide the data recovery component of traditional business continuity RTO, or set to zero, to permit the solver to identify the worst-case recovery time as a side effect.

$p^{loss}$: loss penalty rate for RPO violation ($/s).

$p^{unavail}$: outage penalty rate for RTO violation ($/s).

Workload Parameters

Data dependability designs are sensitive to characteristics of the storage workload. These characteristics can be measured from an existing system or estimated by a person or a tool from a repertoire of well-known workloads. Existing design processes use both approaches. Workload characteristics that do not affect the choice of data dependability resuts, such as solutions, are ignored, as existing performance provisioning tools can be used to address these design issues. Most data protection schemes are sensitive to the average update rate: the volume of updates over a given interval, divided by the interval length. Synchronous mirroring results, such as synchronous mirroring solutions are also sensitive to the short-term peak-to-average burstiness of writes, which is typically 3-10× the long-term average write rate. Techniques that accumulate modifications over an interval (e.g., incremental tape backup) are more sensitive to the workload's update rate, the update rate after earlier updates to rewritten data have been discarded. Longer accumulation intervals allow more time for overwrites, so they often have lower update rates. This rate is modeled by a series of tuples of the form <interval duration, update rate>.

wkldCapacity: workload data object capacity (B). This formulation assumes a single workload data object.

avgUpdateRate: average update rate; no rewrite absorption (B/s).

burstMultiplier: short-term burst update-rate multiplier.

<$duration_w$, $UpdateRate_w$>: update rate (B/s) over the given duration(s), after absorbing overwrites.

Derived Workload Parameters $Capacity_w = duration_w * UpdateRate_w$: total size (capacity) of update rate during the given duration (B).

Failure Parameters

Failures that people want to protect data against can be grouped into several threat categories, including:

Data loss: threats that cause data to be lost, including hardware failures of the data storage devices themselves, or an encompassing failure, such as a building fire. Recently-written data is often more vulnerable to such failures because it may not have propagated to fully protected storage (e.g., it might still reside in a volatile OS buffer, or might not have propagated to a remote site yet).

Data corruption: threats that change data into a form that cannot be used, including defective software or firmware, and viruses.

This formulation focuses on data loss events for the primary copy, such as a primary site disaster or failure of a primary disk array. Data corruption and inaccessibility threats can be mapped into loss of the primary copy.

$failureLikelihood_f$: likelihood of failure scope f during a year (fraction in [0,1])

Disk Array Parameters

One or more disk arrays store the primary copy of data, using RAID 10 (striped mirrors). Disk arrays are modeled as having an upper bound on capacity (bytes) and a rate at which data can be restored (bytes/s). This formulation considers complete failure of the primary array or site, assuming that disk arrays protect against internal single-component failures. For simplicity, it assumes the entire dataset is protected in the same way; in practice, different storage volumes may be handled differently.

The disk array cost model captures details such as the costs of the array chassis/enclosures, redundant front-end controllers (including caches), high-end array back-end controllers, and the disk drives and the trays in which they are mounted. It estimates the cost of floor space, power, cooling, and operations by using a fixed facilities cost plus a variable cost that scales with capacity. Substantially all equipment capital outlay costs are amortized over a depreciation period, which is assumed to be the lifetime of the equipment.

maxDisks: maximum number of disks in each array.

diskCapacity: capacity per disk drive (B).

arrayReloadBW: maximum disk array reload rate (B/s).

enclosureCost: outlay cost of disk array enclosure ($/enclosure).

diskCost: outlay cost of disk ($/disk).

fixedFacilitiesCost: fixed outlay cost for facilities ($/yr).

varFacilitiesCost: variable outlay cost for facilities ($/B/yr).

depreciationPeriod: period over which capital outlay costs are amortized (depreciated) (yr).

Derived Disk Array Parameters arrayCapacity=maxDisks*diskCapacity: disk array capacity (B).

$$numDiskArrays = \left\lceil \frac{2*wkldCapacity}{arrayCapacity} \right\rceil:$$

total number of disk arrays for the primary copy of the workload (assuming RAID 10 protection).

$$numDisks = \left\lceil \frac{2*wkldCapacity}{diskCapacity} \right\rceil:$$

total number of disks for the primary copy of the workload (assuming RAID 10 protection).

primaryCost: total amortized outlay cost for the primary copy disk array storage and facilities ($/yr).

$$primaryCost = \frac{\begin{pmatrix} numDiskArrays \times enclosureCost + \\ numDisks \times diskCost \end{pmatrix}}{depreciationPeriod} +$$
$$2*varFacilitiesCost \times wkldCapacity + fixedFacilitiesCost$$

Remote Mirroring Parameters

Remote mirroring protects against loss of the primary by keeping an isolated copy on one or more disk arrays at a secondary site. The remote mirroring model includes a transfer rate (bytes/s) for the network links connecting the mirrors, a link cost ($/year), and an upper bound on the number of links that may be deployed. New link types may be incorporated by providing values for these parameters.

mirrorCacheCapacity: size of buffer used to smooth out async link IOs (B).

w(M)∈W(M) ⊂ W={1 min, 5 min, 1 hr, 4 hr, 12 hr, 24 hr}: type of asynchronous batch window for coalescing writes.

linkBW: link bandwidth (B/s).

linksMax: upper bound on number of links.

linkCost: annual outlay cost for a network link ($/yr).

Derived Remote Mirroring Parameters:

The primary cost factors for remote mirroring systems are the costs of (1) the storage for the remote copy and (2) the number of network links used to match the write rate at the primary. The costs and penalties depend on the remote mirroring protocol:

Synchronous mirroring (sync): the secondary receives and applies each write before the write completes at the primary. This scheme includes low latency (e.g., close proximity) between the sites to obtain substantially good performance, but no data is lost if the primary fails. Links are provisioned to support the short-term burst write bandwidth:

$$linksMin_{sync} = \left\lceil \frac{avgUpdateRate*burstMultiplier}{linkBW} \right\rceil:$$

lower bound on the number of links for synchronous mirroring.

$dataLoss_{sync,f}=0$: potential data loss for synchronous mirroring is zero for array failures and for site disasters(s).

Write-order preserving asynchronous mirroring (async): this conservative protocol propagates substantially all primary writes (without coalescing rewrites) to the secondary as fast as the inter-array interconnects allow. Updates are applied in the same order at both sites, but updates to the secondary may lag. This asynchrony may increase the performance of the foreground workload beyond inter-site distances of a few tens of km, but updates may be lost if the primary fails. The primary is configured with a write buffer that is large enough to smooth the observed worst-case update bursts for the workload. As a result, the links are provisioned to support the long-term average (substantially non-unique) update rate:

$$linksMin_{async} = \left\lceil \frac{avgUpdateRate}{linkBW} \right\rceil:$$

lower bound on the number of links used for write-order preserving asynchronous mirroring.

Updates that have not been transferred to the secondary are at risk when the primary fails. The worst-case time window for data loss is given by the time it takes to fill or drain the write buffer, whose entire contents may be lost on a failure:

$$dataLoss_{async,array} = \frac{mirrorCacheCapacity*numDiskArrays}{avgUpdateRate}:$$

potential data loss for write-order preserving asynchronous mirroring under array failure(s).

$$dataLoss_{async,array} =$$
$$\frac{mirrorCacheCapacity}{Min(avgUpdateRate/numDiskArrays, numLinks_{async}*linkBW)},$$
$$\text{but } numLinks_{async} \geq \left\lceil \frac{avgUpdateRate}{linkBW} \right\rceil. \text{ Therefore}$$
$$Min(avgUpdateRate/numDiskArrays, numLinks_{async}*linkBW) =$$
$$avgUpdateRate/numDiskArrays.$$

In the site disaster model the potential data loss for write-order preserving asynchronous mirroring is $$dataLoss_{async,site} = \frac{mirrorCacheCapacity*numDiskArrays}{avgUpdateRate}.$$

Batched asynchronous mirroring with write absorption (asyncB): this protocol reduces bandwidth costs by coalescing repeated writes to the same data. Updates accumulate into batches at the primary and periodically propagate to the secondary mirror, which applies each batch of updates atomically. Batch boundaries are declared at fixed time intervals, ranging from one minute to 24 hours. The link bandwidth supports the worst-case update rate over the batch interval:

$$linksMin_{asyncB,w(M)} = \left\lceil \frac{UpdateRate_{w(M)}}{linkBW} \right\rceil :$$

lower bound on the number of links for batched asynchronous mirroring with write absorption.

The potential data loss is the size of two delayed batches (one accumulating and one in transit to the secondary), so the worst-case loss window is approximated as twice the batch interval:

dataLoss$_{asyncB,w(M),f}$=2*duration$_{w(M)}$: potential data loss for batched asynchronous mirroring with write absorption for array failures and for site disasters(s).

Tape Backup Parameters

Backups are modeled as occurring at fixed intervals ranging from 4 to 48 hours. Periodic full backups are optionally interspersed with cumulative incremental backups, which copy the data modified since the last full backup. For example, backup intervals of 24 hrs with incremental cycle counts of 6, 13 or 27 days correspond roughly to weekly, bi-weekly, or monthly full backups interspersed with daily incremental backups.

tapeCapacity: tape media capacity (B).
tapeDriveBW: tape drive rate (B/s).
tapeDrivesMax: upper bound on number of drives in tape library.
tapesMax: upper bound on number of tapes in library.
w(F)∈W(F)⊂W={4 hr,12 hr,24 hr,48 hr}: type of full backup window.
w(I)∈W(I)⊂W={4 hr,12 hr,24 hr,48 hr}: type of incremental backup window.
cycleCount$_k$∈{0,6,13,27}: number of incrementals between full backups.
RT$_{vault}$: time to retrieve tapes from offsite vault(s).
tapeLibraryCost: outlay cost for tape library, including chassis plus media slots ($/library).
tapeDriveCost: outlay cost for a tape drive ($/drive).
tapeCost: outlay cost for tape media cartridge ($/tape).
fixedVaultCost: fixed outlay for tape vault ($/yr).
vaultPerShipmentCost: outlay cost for a shipment to tape vault ($/shipment).
numVaultShipments: number of shipments to tape vault per year.

Derived Tape Backup Parameters

The backup process creates a read-only snapshot of the primary data, and then uses the snapshot as the source for the backup to tape (be it full or incremental). Snapshots may be taken using space-efficient copy-on-write techniques, or by isolating a local mirror and synchronizing it with the primary copy after the backup is complete. The disk space used for a space-efficient incremental snapshot is determined from the average update rate and the backup interval.

In an embodiment, each backup finishes before the next one starts, effectively defining a backup window equal to the interval duration. The tool provisions sufficient tape drives to complete each backup within its window, so the lower bound on the number of tape drives is:

tapeDrives_Min$_{k,w(F),w(I)}$=Max(tapeDrives_MinFull$_{w(F)}$, tapeDrives_MinIncr$_{k,w(F),w(I)}$):lower bound on the number of tape drives used under policy [k,w(F),w(I)].

where the number of drives used for a full backup is:

$$tapeDrivesMinFull_{w(F)} = \left\lceil \frac{wkldCapacity}{duration_{w(F)} * tapeDriveBW} \right\rceil :$$

lower bound on the number of drives used for a full backup.

and the number of tape drives used for the largest incremental backup is:

$$tapeDrivesMinIncr_{k,w(F),w(I)} =$$
$$\left\lceil \frac{Capacity_{w(F)} + (cycleCount_k - 1) * Capacity_{w(I)}}{duration_{w(I)} * tapeDriveBW} \right\rceil :$$

lower bound on the number of tape drives used for the largest incremental backup.

Tapes are retained for a single full backup cycle, which includes the last full backup and substantially all subsequent incremental backups. Each full backup is written onto a new set of tapes rather than the tapes for the previous full backup, in case it fails to complete. When a full backup completes, the tapes for the previous full backup are sent to the vault, and the tapes at the vault are recycled back to the primary site. The tapes are kept at the primary until this time in case they are used quickly to respond to operator errors (e.g., rm*). Thus the total number of retained tapes is:

numTapes$_{k,w(F),w(I)}$=4*numTapesFull+numTapesIncr$_{k,w(F),w(I)}$: total number of retained tapes under policy [k,w(F),w(I)]. This includes four sets of tapes for full backups: one set for the last full, one set for the new full (to ensure that it successfully completes without erasing the old full backup), one set for the remote tape vault, and a final set to be in transit between the local and remote sites.

where the number of tapes for a full backup is:

$$numTapesFull = \left\lceil \frac{wkldCapacity}{tapeCapacity} \right\rceil :$$

number of tapes for a full backup.

$$numTapesArrayFull = \left\lceil \frac{numTapesFull}{numDiskArrays} \right\rceil :$$

number of tapes for an array's worth of the full backup.

The number of tapes for substantially all incremental backups during a cycle is calculated by summing the number of tapes used for each one. It is assumed that each backup starts on a new tape. Taking into account the fact that the full backup interval may be larger than the incremental one:

$$numTapesIncr_{k,w(F),w(I)} = \sum_{i=0}^{cycleCount(k)-1} \left\lceil \frac{sizeOfIncr_i}{tapeCapacity} \right\rceil :$$

number of tapes for substantially all incremental backups during a cycle (where sizeOfIncr$_i$=Capacity$_{w(F)}$+ i*Capacity$_{w(I)}$).

$$numTapesMaxIncr_{k,w(F),w(I)} = \left\lceil \frac{Capacity_{w(F)} + (cycleCount_k - 1) * Capacity_{w(I)}}{tapeCapacity} \right\rceil :$$

number of tapes at the largest incremental backup cycle.

$$numTapesArrayMaxIncr_{k,w(F),w(I)} \left\lceil \frac{numTapesMaxIncr_{k,w(F),w(I)}}{numDiskArrays} \right\rceil :$$

number of tapes for an array's worth of the largest incremental backup.

A primary array failure may destroy any backup in progress at the time of the failure, possibly losing substantially all updates from both the current (accumulating) backup interval and the previous (propagating) backup interval. Assuming full intervals are at least as long as incremental intervals; the worst-case data loss is the sum of the full and incremental backup intervals:

$dataLoss_{k,w(F),w(I),array}$=duration$_{w(F)}$+duration$_{w(I)}$: potential data loss for backup under policy [k,w(F),w(I)] for an array failure(s).

In the event of a primary site disaster, the worst-case data loss occurs if the site is destroyed just before the new full backup completes and the old full backup is shipped offsite. In this case, the data at the vault is out-of-date by twice the full backup cycle duration, plus the interval for the latest full backup:

$dataLoss_{k,w(F),w(I),site}$=2*intervalCycle$_k$+duration$_{w(F)}$: potential data loss for backup under policy [k,w(F),w(I)] for a site disaster(s), where intervalCycle$_k$=duration$_{w(F)}$+ cycleCount$_k$*duration$_{w(I)}$: interval between full backups(s).

Spare Resources Parameters

Reconstruction can begin as soon as the secondary data copy is available, and sufficient target disk arrays are ready. If standby resources are available, reconstruction can begin nearly immediately; otherwise, resources are to be found or acquired, drained if they are in use for another purpose, (re)configured and/or (re)initialized (formatted). To minimize this delay, sites often keep standby equipment in various states of readiness. This formulation models a spectrum of spare resource options, as shown below. In substantially all cases, the model assumes that any spare resources are eventually replaced with new equipment, and factors this replacement cost out of the equations.

Spare resource options are modeled by the outlay cost of maintaining ready resources (either dedicated or shared) and the recovery time and corresponding financial penalties to provision those resources. One way of achieving access to spare resources is to rent access to a shared resource pool. Several companies offer such a service, which can be much cheaper than a dedicated backup site. The cost of shared resources is modeled by a fixed discount factor.

$t_{identify}$: time to identify that spare resources are available(s).

$t_{configure}$: time to configure spare resources(s).

$t_{scrub}$: time to scrub spare resources(s).

$t_{negotiate}$: time to negotiate spare resources(s).

spareCost: outlay cost of spare disk array storage and facilities ($/yr).

spareDiscount: discount factor for shared resources (fraction in [0, 1]).

Derived Spare Resources Parameters $RT_{hot}$=$t_{identify}$: recovery time from a hot spare resource(s).

$RT_{unconfig}$=$t_{identify}$+$t_{configure}$: recovery time from an unconfigured spare resource(s).

$RT_{occupied}$=$t_{identify}$+$t_{scrub}$+$t_{negotiate}$: recovery time from an occupied spare resource(s).

$RT_{occUnconfig}$=$t_{identify}$+$t_{configure}$+$t_{scrub}$+$t_{negotiate}$: recovery time from an occupied and unconfigured spare resource(s).

$RT_{none}$=$t_{order}$+$t_{configure}$+$t_{identify}$: recovery time from no spare resources(s).

$O_{hot}$=spareCost: outlay cost of a hot spare resource ($/yr).

$O_{unconfig}$=spareCost: outlay cost of an unconfigured spare resource ($/yr).

$O_{occupied}$=spareCost*spareDiscount: outlay cost of an occupied spare resource ($/yr).

$O_{occUnconfig}$=pareCost*spareDiscount: outlay cost of an occupied and unconfigured spare resource ($/yr).

$O_{none}$=0: outlay cost of no spare resources ($/yr).

Decision Variables and Derived (State) Variables

The mixed integer program declares variables for each decision it makes in determining a primary result, such as a primary solution. A set of binary decision variables represents the data protection alternatives and their base configurations. Each binary variable corresponds to a single protection alternative (e.g., mirroring or backup) and a specific set of discrete configuration parameters (e.g., "batched asynchronous mirroring with a write absorption interval of one minute"). Integer decision variables represent the number of bandwidth devices (e.g., network links or tape drives) for each alternative.

Mirroring Decision Variables $$x_m = \begin{cases} 1 & \text{choose mirroring } m \in \{sync, async\} \\ 0 & \text{otherwise} \end{cases}$$

$$x_{asyncB,w(M)} = \begin{cases} 1 & \text{choose window } w(M) \in W(M) \\ 0 & \text{otherwise} \end{cases}$$

$y_m$: number of links used for synchronous and asynchronous mirroring m∈{sync,async}

$y_{asyncB,w(M)}$: number of links used for batched asynchronous mirroring with write absorption for window type w(M)∈W(M).

When formulated in the straightforward fashion described above, the recovery time models have terms that depend inversely on the number of links or tape drives y. The resulting optimization issue becomes non-linear. Although solvers exist for certain classes of non-linear optimization issues, they may take an unacceptably long time to find a result, or fail to find one. Linear solvers exploit theoretical results about the search space structure to solve significantly larger equations in seconds. To address this issue, the models are recast by introducing new variables z standing for the inverse of the y terms:

$z_m$=1/$y_m$: linearization variable.

$z_{asyncB,w(M)}$=1/$y_{asyncB,w(M)}$: linearization variable.

Because mirroring keeps a copy of the data constantly accessible, recovery can proceed via reconstructing the primary from the secondary across the network:

$$recoveryTime_{m,array} = \frac{arrayCapacity}{linkBW} * z_m \quad m \in \{sync, async\}:$$

derived variable for the recovery time of synchronous and asynchronous mirroring under array failures(s).

$$recoveryTime_{m,site} = \frac{wkldCapacity}{linkBW} * z_m \quad m \in \{sync, async\}:$$

derived variable for the recovery time of synchronous and asynchronous mirroring under site disasters(s).

$$recoveryTime_{asyncB,w,array} = \frac{arrayCapacity}{linkBW} * z_{asyncB,w} \quad w \in W(M):$$

derived variable for the recovery time of batched asynchronous mirroring with write absorption under array failures(s).

$$recoveryTime_{asyncB,w,site} = \frac{wkldCapacity}{linkBW} * z_{asyncB,w} \quad w \in W(M):$$

derived variable for the recovery time of batched asynchronous mirroring with write absorption under site disasters(s).

Backup Decision Variables $$x_{k,w(F),w(I)} = \begin{cases} 1 & \text{choose backup policy } [k, w(F), w(I)] \\ 0 & \text{otherwise} \end{cases}$$

$y_{k,w(F),w(I)}$: number of drives when backup policy $[k, w(F), w(I)]$ is used.

$$z_{k,w(F),w(I)} = \frac{1}{y_{k,w(F),w(I)}}: \text{linearization variable.}$$

$$u_{k,w(F),w(I)} = \text{Max}\left(\left\lceil \frac{y_{k,w(F),w(I)}}{tapeDrivesMax} \right\rceil, \left\lceil \frac{numTapes_{k,w(F),w(I)}}{tapesMax} \right\rceil \right):$$

number of libraries under backup policy $[k, w(F), w(I)]$.

Recovery from tape is a three-phase process: first, if the tapes are stored at an offsite vault, they are to be retrieved to the recovery site; second, the latest full backup is restored and third, the latest subsequent incremental backup is restored. Vaults can be close to or far away from the target data recovery location. The largest capacity incremental backup is the last one of the cycle. To simplify the formulation, the models assume that substantially all the tape drives in each library operate in parallel during each phase and that data is spread evenly across the tapes and drives. Tape load time is ignored because it is typically less than 5% of the time to read the tape.

The worst-case recovery time is the time to retrieve the tapes from the offsite vault (in the case of a site disaster), plus the time to restore the last full and the last incremental backup of a cycle:

$$recoveryTime_{k,w(F),w(I),array} = \left( \frac{\left( numTapesArrayFull + numTapesArrayMaxIncr_{k,w(F),w(I)} \right) * tapeCapacity}{tapeDriveBW} \right) * z_{k,w(F),w(I)} \quad \forall [k, w(F), w(I)]:$$

derived variable for recovery time under backup policy $[k,w(F),w(I)]$ for array failures(s).

$$recoveryTime_{k,w(F),w(I),site} = \left( RT_{vault} + \frac{\left( numTapesFull + numTapesMaxIncr_{k,w(F),w(I)} \right) * tapeCapacity}{tapeDriveBW} \right) * z_{k,w(F),w(I)} \quad \forall [k, w(F), w(I)]$$

derived variable for recovery time under backup policy $[k,w(F),w(I)]$ for site disasters(s).

Spare Resources Decision Variables $$x_s = \begin{cases} 1 & \text{choose spare } s \in S \\ 0 & \text{otherwise} \end{cases} \quad recoveryTime_{spare} = \sum_{s \in S} RT_s * x_s:$$

derived variable for recovery time of spare resources alternatives under both array failures and site disasters(s).

Penalty Decision Variables

The target recovery time and recovery point objectives (RTO and RPO) are considered soft constraints, because penalties are assessed when they are violated. The following decision variables determine the degree of violation.

$v_{m,f}^{RTO}$: violation of target RTO under synchronous or asynchronous mirroring ($m \in \{sync, async\}$) for failure scope f(s).

$v_{asyncB,w(M),f}^{RTO}$: violation of target RTO under asynchronous mirroring with write absorption for window type w(M) $\in W(M)$ for failure scope f(s).

$v_{k,w(F),w(I),f}^{RTO}$: violation of target RTO under backup policy $[k,w(F),w(I)]$ for failure scope f(s).

$v_{m,f}^{RPO}$: violation of target RPO under synchronous or asynchronous mirroring ($m \in \{sync, async\}$) for failure scope f(s).

$v_{asyncB,w(M),f}^{RPO}$: violation of target RPO under asynchronous mirroring with write absorption for window type w(M) $\in W(M)$ for failure scope f(s).

$v_{k,w(F),w(I),f}^{RPO}$: violation of target RPO under backup policy $[k,w(F),w(I)]$ for failure scope f(s).

Outlay Derived Variables $$O^{mirror} = primaryCost * \left( \sum_{m \in \{sync, async\}} x_m + \sum_{w \in W(M)} x_{asyncB,w} \right) +$$

$$linkCost * \left( \sum_{m \in \{sync, async\}} y_m + \sum_{w \in W(M)} y_{asyncB,w} \right):$$

total outlay cost for enabled mirroring alternative for primary array failure and site disaster under reconstruction ($/yr).

$$O^{backup} = \frac{2 * \begin{pmatrix} tapeLibraryCost \sum_{k,w(F),w(I)} u_{k,w(F),w(I)} + \\ tapeDriveCost \sum_{k,w(F),w(I)} y_{k,w(F),w(I)} \end{pmatrix}}{depreciationPeriod} +$$

$$\frac{diskCost}{diskCapacity * depreciationPeriod} *$$

$$\sum_{k,w(F),w(I)} (wkldCapacity + uniqueCapacity_{w(F)}) * x_{k,w(F),w(I)} : +$$

$$tapeCost \sum_{k,w(F),w(I)} numTapes_{k,w(F),w(I)} * x_{k,w(F),w(I)} +$$

$$fixedVaultCost + vaultPerShipmentCost *$$

$$numVaultShipments$$

total outlay cost for any enabled backup and vaulting alternative ($/yr). To reconstruct data after a site disaster, a tape library is used at the reconstruction site, in addition to the tape library used to create the backup at the primary site. The model assumes that tapes are replaced every year, to guard against media failures. Finally, this cost also includes a component for the disks to store snapshots or split mirrors to permit consistent backups.

$$O^{spare} = \sum_{s \in S} O_s * x_s :$$

outlay cost for spare resources ($/yr).

Penalty Derived Variables $$P^{unavail} = p^{unavail} \left[ \sum_{f \in FailureScopes} failureLikelihood_f * \left( \sum_{m \in \{sync,async\}} v_{m,f}^{RTO} + \right. \right.$$
$$\left. \left. \sum_{w \in W(M)} v_{asyncB,w,f}^{RTO} + \sum_{k,w(F),w(I)} v_{k,w(F),w(I),f}^{RTO} \right) \right] :$$

total penalty for target RTO violation ($/yr).

$$P^{loss} = p^{loss} \left[ \sum_{f \in FailureScopes} failureLikelihood_f * \left( \sum_{m \in \{sync,async\}} v_{m,f}^{RPO} + \right. \right.$$
$$\left. \left. \sum_{w \in W(M)} v_{asyncB,w,f}^{RPO} + \sum_{k,w(F),w(I)} v_{k,w(F),w(I),f}^{RPO} \right) \right] :$$

total penalty for target RPO violation ($).

Objective Function

The optimization's objective is to minimize overall annual business cost, defined as outlays plus expected penalties for primary copy failures:

$$Min(O^{array} + O^{mirror} + O^{backup} + O^{spare} + P^{unavail} + P^{loss})$$

Constraints

1) Exactly one data protection alternative is chosen in an embodiment.

$$\sum_{m \in \{sync,async\}} x_m + \sum_{w \in W(M)} x_{asyncB,w} + \sum_{k,w(F),w(I)} x_{k,w(F),w(I)} = 1$$

$$k \in K, w(F) \in W(F), w(I) \in W(I)$$

2) Exactly one spare resource alternative is chosen in an embodiment.

$$\sum_{s \in S} x_s = 1$$

3) The number of bandwidth devices for a data protection alternative is either zero (if that alternative has not been chosen), or it is within the range specified by the upper and lower bounds calculated or specified for the alternative.

linksMin$_m$*$x_m \leq y_m \leq$ linksMax*$x_m$ $m \in \{sync, async\}$ linksMin$_{asyncB,w}$*$x_{asyncB,w} \leq$
$y_{asyncB,w} \leq$ linksMax*$x_{asyncB,w}$ $w \in W(M)$ tapeDrivesMin$_{k,w(F),w(I)}$*$x_{k,w(F),w(I)} \leq y_{k,w(F),w(I)}$
$\leq$ tapeDrivesMax*$u_{k,w(F),w(I)}$ $k \in K, w(F) \in W(F), w(I) \in W(I)$ 4) The aggregate data protection technique bandwidth may not exceed the aggregate primary array reload rate.

linkBW*$y_m \leq$ arrayReloadBW*numDiskArrays
$m \in \{sync, async\}$ linkBW*$y_{asyncB,w} \leq$ arrayReloadBW*numDiskArrays
$w \in W(M)$ tapeDriveBW*$y_{k,w(F),w(I)}$
$\leq$ arrayReloadBW*numDiskArrays $k \in K, w(F) \in W(F), w(I) \in W(I)$ 5) The number of tape libraries, which is the maximum between the number of tapes per library and number of tape drives per library, can be linearized as follows:

$u_{k,w(F),w(I)} \geq y_{k,w(F),w(I)}$/tapesDrivesMax $u_{k,w(F),w(I)} \geq (numTapes_{k,w(F),w(I)}$/tapesMax)*$x_{k,w(F),w(I)}$ 6) The recovery time limit is satisfied.

The extra term on the right hand side of each inequality is intended to add a large number (constant C, e.g., five years) when that alternative is not chosen, permitting the penalty to be zero.

(recoveryTime$_{m,f}$+recoveryTime$_{spares}$)−
$v_{m,f}^{RTO} \leq$ targetRTO+(1−$x_m$)*C $m \in \{sync, async\}$ and $f \in$ failureScopes (recoveryTime$_{asyncB,w,f}$+recoveryTime$_{spares}$)−
$v_{asyncB,w,f}^{RTO} \leq$ targetRTO+(1−$x_{asyncB,w}$)*C $w \in W(M)$ and $f \in$ failureScopes (recoveryTime$_{k,w(F),w(I),f}$+recoveryTime$_{spares}$)−
$v_{k,w(F),w(I),array}^{RTO} \leq$ targetRTO+(1−$x_{k,w(F),w(I)}$)*C
$k \in K, w(F) \in W(F), w(I) \in W(I)$ and $f \in$ FailureScopes 7) The data loss limit is satisfied.

$$dataLoss_{m,f} * x_{m,f} - v_{m,f}^{RPO} \leq targetRPO \; m \in \{sync, async\},$$
$$f \in FailureScopes$$

$$dataLoss_{asyncB,w,f} * x_{asyncB,w,f} - v_{asyncB,w,f}^{RPO} \leq targetRPO$$
$$w \in W(M), f \in FailureScopes$$

$$dataLoss_{k,w(F),w(I),f} * x_{k,w(F),w(I)} - v_{k,w(F),w(I),f}^{RPO} \leq targetRPO \; k \in K, w(F) \in W(F), w(I) \in W(I)$$
$$\text{and } f \in FailureScopes$$

8) Linearization constraints for $z=1/y$.

The formulation introduces additional constraints on the optimization issue to ensure that the transformed equation is equivalent to the original. Since the transformation from y to z is convex, well-known techniques can be used to linearize the convex constraints in continuous variables. For example, by constraint 3), the y variable is an integer in the interval $\lfloor linksMin_{sync}, linksMax \rfloor$. Consider a partition of this interval into n subintervals, where the points in the partitions $\langle y_{sync}^0 < y_{sync}^1 < \ldots < y_{sync}^n \rangle$ are integers in the interval $\lfloor linksMin_{sync}, linksMax \rfloor$. Then, $z_{sync}^j = 1/y_{sync}^j$ $j=0,1,\ldots,n$. Express the y and z variables as a convex combination of the points that define the subintervals in the partition. Let $\lambda_{sync}^j \geq 0$ be the non-negative continuous variable that represents a point in the partition, for $j=0,1,\ldots,n$. Thus, $$y_{sync} = \sum_{j=0}^{n} y_{sync}^j * \lambda_{sync}^j$$

$$z_{sync} = \sum_{j=0}^{n} z_{sync}^j * \lambda_{sync}^j$$

$$x_{sync} = \sum_{j=0}^{n} \lambda_{sync}^j$$

An additional constraint is introduced to ensure that at most two consecutive lambdas can be non-zero. Thus the lambdas are defined as SOS2 variables. Most commercially available solvers enable SOS2 functionality.

Generalizing to substantially all data protection techniques:

8.1) $y_{.} = \sum_{n \in N} y_{.}^n * \lambda_{.}^i$ and $z_{.} = \sum_{n \in N} z_{.}^n * \lambda_{.}^i$ Where the dot (.) means m, [asyncB,w], or [k,w(F),w(I)], $(y_{.}^n)$ $n \in N$ is a given partition of the interval where the variable is defined and $z_{.}^n = 1/y_{.}^n$.

8.2) $\sum_{n \in N} \lambda_{.}^n = x_{.}$ 8.3) $\lambda_{.}^n$ is a decision variable within the model, defined as an SOS2 variable, that enforce the piece-wise linearization of $z=1/y$.

Hardware and Operating Environment

This section provides an overview of the example hardware and the operating environment in which embodiments of the invention can be practiced.

Figure 10:
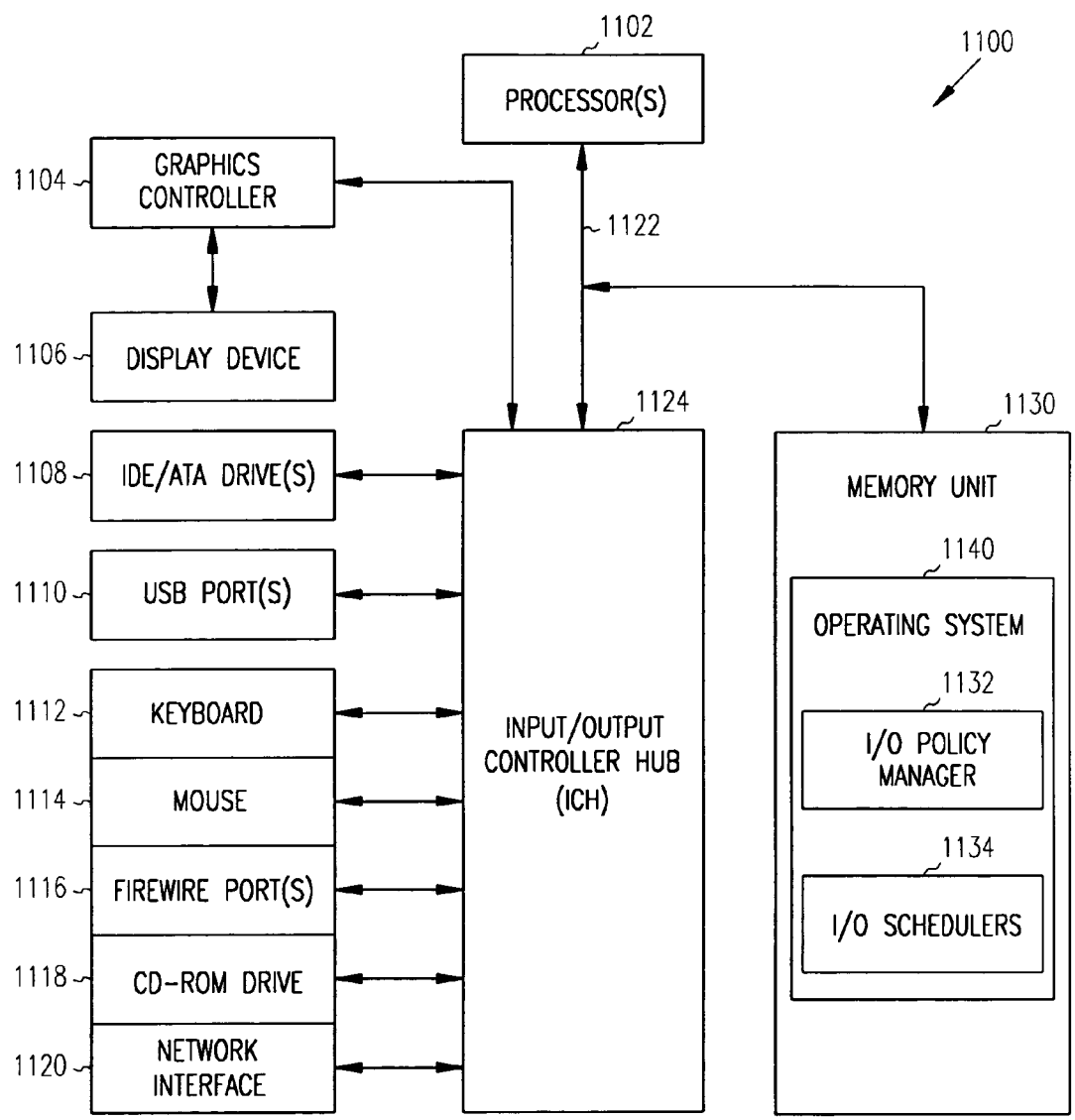
FIG. 10 illustrates an example computer system used in conjunction with certain example embodiments.

FIG. 10 illustrates an example computer system used in conjunction with certain embodiments of the invention. As illustrated in FIG. 10, computer system 1100 comprises processor(s) 1102. The computer system 1100 also includes a memory unit 1130, processor bus 1122, and Input/Output controller hub (ICH) 1124. The processor(s) 1102, memory unit 1130, and ICH 1124 are coupled to the processor bus 1122. The processor(s) 1102 may comprise any suitable processor architecture. The computer system 1100 may comprise one, two, three, or more processors, any of which may execute a set of instructions in accordance with embodiments of the present invention.

The memory unit 1130 includes an operating system 1140, which includes an I/O scheduling policy manager 1132 and I/O schedulers 1134. The memory unit 1130 stores data and/or instructions, and may comprise any suitable memory, such as a dynamic random access memory (DRAM), for example. The computer system 1100 also includes IDE drive(s) 1108 and/or other suitable storage devices. A graphics controller 1104 controls the display of information on a display device 1106, according to embodiments of the invention.

The Input/Output controller hub (ICH) 1124 provides an interface to I/O devices or peripheral components for the computer system 1100. The ICH 1124 may comprise any suitable interface controller to provide for any suitable communication link to the processor(s) 1102, memory unit 1130 and/or to any suitable device or component in communication with the ICH 1124. For one embodiment of the invention, the ICH 1124 provides suitable arbitration and buffering for each interface.

For one embodiment of the invention, the ICH 1124 provides an interface to one or more suitable integrated drive electronics (IDE) drives 1108, such as a hard disk drive (HDD) or compact disc read-only memory (CD ROM) drive, or to suitable universal serial bus (USB) devices through one or more USB ports 1110. For one embodiment, the ICH 1124 also provides an interface to a keyboard 1112, a mouse 1114, a CD-ROM drive 1118, and one or more suitable devices through one or more firewire ports 1116. The ICH 1124 also provides a network interface 1120 though which the computer system 1100 can communicate with other computers and/or devices.

In one embodiment, the computer system 1100 includes a machine-readable medium that stores a set of instructions (e.g., software) embodying any one, or all, of the methodologies for dynamically loading object modules described herein. Furthermore, software can reside, completely or at least partially, within memory unit 1130 and/or within the processor(s) 1102.

Thus, a system, method, and machine-readable medium including instructions for Input/Output scheduling have been described. Although the present invention has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense.

The invention claimed is:
1. A method comprising:
   selecting a candidate design having computer systems and storage systems;
   modeling, by at least one processor, the selected candidate design having at least one failure event to determine an amount of outage time associated with the at least one failure event for the candidate design; and determining, by the at least one processor, a first penalty cost associated with the outage time of the selected candidate design by applying a first penalty cost rate function.

2. The method of claim 1 further comprising multiplying the first penalty cost associated with the outage time by a weighting factor.

3. The method of claim 1 further comprising:
modeling the candidate design having the at least one failure event to determine an amount of data loss associated with the failure event for the candidate design; and
determining a second penalty cost associated with the data loss of the selected candidate design by applying a second penalty cost rate function.

4. The method of claim 3 further comprising multiplying the second penalty cost associated with the data loss by a weighting factor.

5. The method of claim 3 further comprising adding the first penalty cost and the second penalty cost to determine a total penalty cost associated with the at least one failure event.

6. The method of claim 3 further comprising adding a product of the first penalty cost and a weighting factor associated with the at least one failure event to a product of the second penalty cost and a weighting factor associated with the at least one failure event to determine a total penalty cost associated with the at least one failure event.

7. The method of claim 5 further comprising:
determining an outlay cost associated with a set of configuration parameters associated with the candidate design; and
adding the total penalty cost to the outlay cost associated with a set of configuration parameters to determine a total cost of the candidate design.

8. The method of claim 6 further comprising:
determining an outlay cost associated with a set of configuration parameters associated with the candidate design; and
adding the total penalty cost to the outlay cost associated with a set of configuration parameters to determine a total cost of the candidate design.

9. The method of claim 3 wherein the first penalty cost rate function differs from the second penalty cost rate function.

10. The method of claim 3 wherein the first penalty cost rate function and the second penalty cost rate function are selected by a system user.

11. The method of claim 3 wherein at least one of the first penalty cost rate function and the second penalty cost rate function includes a linear function.

12. The method of claim 3 wherein at least one of the first penalty cost rate function and the second penalty cost rate function includes a step function.

13. The method of claim 3 wherein at least one of the first penalty cost rate function and the second penalty cost rate function includes an exponential function.

14. The method of claim 3 wherein at least one of the first penalty cost rate function and the second penalty cost rate function is related to the data dependability specifications of a system.

15. A method comprising:
selecting a candidate design configuration including computer systems and storage systems, wherein the candidate design configuration is associated with a plurality of failure events;
modeling, by at least one processor, the candidate design configuration having a first failure event of the plurality of failure events to determine an amount of outage time associated with the first failure event for the candidate design configuration; and
modeling, by the at least one processor, the candidate design configuration having a second failure event of the plurality of failure events determine an amount of outage time associated with the second failure event for the candidate design configuration.

16. The method of claim 15 further comprising:
determining an outage penalty cost associated with the amount of outage time associated with the first failure event for the candidate design configuration; and
determining an outage penalty cost associated with the amount of outage time associated with the second failure event for the candidate design configuration.

17. The method of claim 16 wherein the outage penalty cost is a function of the duration of the outage.

18. The method of claim 16 wherein the outage penalty cost is based on a value from a look up table relating an outage time with an outage penalty cost.

19. The method of claim 16 further comprising:
determining a probability of the first failure event occurring in a first selected time frame;
determining a probability of the second failure event occurring in a second selected time frame;
multiplying the outage penalty cost associated with the first failure event by the probability of the first failure event occurring; and
multiplying the outage penalty cost associated with the second failure event by the probability of the second failure event occurring.

20. The method of claim 15 further comprising
applying a first outage time penalty cost rate function to the outage time associated with the first failure event and multiplying by a first weighting factor to determine a penalty cost associated with the outage time of the candidate design configuration having the first failure event; and
applying a second outage time penalty cost rate function to the outage time associated with the second failure event and multiplying by a second weighting factor to determine a penalty cost associated with the outage time of the candidate design configuration having the second failure event.

21. The method of claim 20 further comprising adding the penalty cost associated with the outage time of the candidate design configuration having the first failure event, and the penalty cost associated with the outage time of the candidate design configuration having the second failure event.

22. A method comprising:
selecting a candidate design including computer systems and storage systems, wherein the candidate design is associated with a plurality of failure events;
modeling, by at least one processor, the candidate design having a first failure event of the plurality of failure events to determine an amount of data loss associated with the first failure event for the candidate design; and
modeling, by the at least one processor, the candidate design having a second failure event of the plurality of failure events to determine an amount of data loss associated with the second failure event for the candidate design.

23. The method of claim 22 further comprising
applying a first data loss penalty cost rate function to the data loss associated with the first failure event and multiplying by a first weighting factor to determine a penalty cost associated with the data loss of the selected candidate design having the first failure event; and applying a second data loss penalty cost rate function to the data loss associated with the second failure event and multiplying by a second weighting factor to determine a penalty cost associated with the data loss of the selected candidate design having the second failure event.

24. The method of claim 23urther comprising adding the penalty cost associated with the data loss of the selected candidate design having the first failure event, and the penalty cost associated with the data loss of the selected candidate design having the second failure event.

25. The method of claim 23 wherein adding the penalty cost associated with the data loss of the selected candidate design having the first failure event, and the penalty cost associated with the data loss of the selected candidate design having the second failure event is part of determining a total penalty cost for the selected candidate design having the plurality of associated failure events.

26. A method comprising:
selecting a first candidate design;
modeling, by at least one processor, the first candidate design having a failure event to determine:
an amount of outage time associated with the failure event; and
an amount of data loss associated with the failure event; and
determining, by the at least one processor, a first total penalty cost associated with the first candidate design comprising:
determining an outage time penalty cost by applying a first penalty cost rate function to the amount of outage time;
determining a data loss penalty cost by applying a second penalty cost rate function to the amount of data loss; and
adding the outage time penalty cost and the data loss penalty cost;
multiplying the first total penalty cost associated with the first candidate design by a weighting factor to determine a weighted first total penalty cost;
determining a first outlay cost associated with the first candidate design; and
adding the first outlay cost and the weighted first total penalty cost to determine a total cost of the first candidate design.

27. The method of claim 26 further comprising:
selecting a second candidate design;
modeling the second candidate design having a failure event for the selected second candidate design to determine:
an amount of outage time associated with the failure event for the second candidate design; and
an amount of data loss associated with the failure event for the second candidate design; and
determining a second total penalty cost associated with the second candidate design comprising:
determining a second outage time penalty cost by applying a third penalty cost rate function to the amount of outage time associated with the failure event for the second candidate design;
determining a second data loss penalty cost by applying a fourth penalty cost rate function to the amount of data loss associated with the failure event for the second candidate design; and
adding the second outage time penalty cost and the second data loss penalty cost;

multiplying the second total penalty cost associated with the second candidate design by a weighting factor to determine a weighted second total penalty cost;
determining a second outlay cost associated with the second candidate design;
adding the second outlay cost of the second candidate design and the weighted second total penalty cost to determine a total cost of the second candidate design; and
selecting one of the first candidate design and the second candidate design based upon a comparison of the total cost of the first candidate design and the total cost of the second candidate design.

28. The method of claim 27 further comprising feeding information back regarding the selection of one of the first candidate design and the second candidate design, wherein the information regarding the selection is used to eliminate selection of another candidate design.

29. The method of claim 27 wherein the selection of one of the first candidate design and the second candidate design based upon a comparison of the total cost of the first candidate design and the total cost of the second candidate design includes selecting the one of the first candidate design and the second candidate design having the least total cost.

30. An apparatus comprising:
at least one processor;
a candidate design generator executable on the at least one processor;
a failure event generator executable on the at least one processor;
a modeling module executable on the at least one processor and communicatively coupled to the candidate design generator and the failure event generator, the modeling module executable to estimate an outage time and an amount of data loss for each of a plurality of selected candidate designs, wherein each of the plurality of selected candidate designs includes computer systems and storage systems; and
a penalty cost module executable on the at least one processor and communicatively coupled to the modeling module, the penalty cost module for determining a penalty cost associated with the estimated amount of outage time and the estimated amount of lost data for each of the plurality of selected candidate designs.

31. The apparatus of claim 30 wherein the penalty cost module is also communicatively coupled to the failure event generator, the failure event generator for generating a weighting factor for at least one failure event.

32. The apparatus of claim 30 further comprising:
an input for a penalty cost rate function associated with the outage time of a failure event; and
an input for a penalty cost rate function associated with an amount of lost data of the failure event.

33. The apparatus of claim 32 further comprising an input for workload characteristics input to candidate design generator.

34. The apparatus of claim 30 further comprising an outlay cost module communicatively coupled to the candidate design generator, the outlay cost module for receiving a set of configuration parameters associated with a generated candidate design, the outlay cost module determining an outlay cost of the generated candidate design in response to the configuration parameters.

35. The apparatus of claim 34 further comprising a total cost module communicatively coupled to the penalty cost module and communicatively coupled to the outlay cost module, the total cost module for adding a penalty cost associated with outage time of a plurality of failures for the generated candidate design, a penalty cost associated with data lost based on a plurality of failures for a generated candidate design, and the outlay cost for a generated solution candidate.

36. The apparatus of claim 35 further comprising a comparator module communicatively coupled to the total cost module, the comparator module to compare a total cost of a first generated candidate design and a total cost of a second generated candidate design.

37. The apparatus of claim 36 further comprising a feedback signal for relaying information on unselected generated candidate designs, wherein the information on unselected candidate designs is used to eliminate another candidate design.

38. A method comprising:
selecting a plurality of candidate designs for a system having computer systems and storage systems, and for each candidate design,
modeling, by at least one processor, one of the plurality of candidate designs to determine an outage time for each of a plurality of failure events;
applying an outage time penalty cost rate function to each outage time to determine a penalty cost associated with the outage time for each of the plurality of failure events for the candidate design; and
weighting the outage penalty costs for each of the plurality of failure events to estimate a weighted total outage time penalty cost for the one candidate design.

39. The method of claim 38 further comprising:
determining an outlay cost of each candidate design; and
adding the penalty cost associated with the outage time for each candidate design to the outlay cost of the candidate design.

40. The method of claim 38 further comprising for each candidate design,
modeling one of a plurality of storage configuration solutions to determine an amount of data lost for each of a plurality of failure events;
applying a data loss penalty cost rate function to each data loss to determine a penalty cost associated with data loss for each of a plurality of failure events for the candidate design; and
weighting the data loss penalty costs for each of a plurality of failure events to estimate a weighted total data loss penalty cost for the one candidate design.

41. The method of claim 40 wherein determining the penalty cost associated with the amount of data lost for each candidate design includes multiplying a total amount of data lost by a data loss penalty cost rate to determine the penalty cost associated with the amount of data lost for the candidate design.

42. The method of claim 40 further comprising:
determining the outlay cost of a selected candidate design;
adding the penalty cost associated with outage time for the selected candidate design; and
adding the penalty cost associated with lost data for the selected candidate design to determine a total cost of the selected candidate design.

43. The method of claim 42 further comprising:
determining the total cost of another candidate design; and
comparing the total cost of the other candidate design to the total cost of the selected candidate design.

44. A machine-readable storage medium that provides instructions that, when executed by a machine, cause the machine to perform operations comprising:
selecting a candidate design configuration having computer systems and storage systems;
modeling the candidate design configuration having a failure event to determine an amount of downtime associated with the failure event; and
applying a penalty cost rate function to the amount of downtime to determine a penalty cost associated with the failure event.

45. The machine-readable storage medium that provides instructions of claim 44 that, when executed by the machine, further cause the machine to perform operations comprising:
modeling the candidate design configuration-having the failure event to determine an amount of data loss associated with the failure event; and
applying a data loss penalty cost rate function to the amount of data loss to determine a data loss penalty cost; and
adding the penalty cost for the downtime and the penalty cost for the lost data to determine a total penalty cost associated with the failure event of the selected candidate design configuration.

46. The machine-readable storage medium of claim 45 wherein modeling the candidate design configuration having the failure event to determine the data loss for the candidate design includes:
modeling a first failure event to determine a first amount of lost data;
modeling a second failure event to determine a second amount of lost data.

47. The machine-readable medium storage of claim 46 wherein the amount of lost data associated with the first failure event is weighted using a first weighting factor and the amount of lost data associated with the second failure event is weighted using a second weighting factor.

48. The machine-readable storage medium of claim 44 wherein modeling the candidate design configuration having the failure event to determine the downtime of the candidate design configuration includes:
modeling a first failure event to determine a first downtime; and
modeling a second failure event to determine a second downtime.

49. The machine-readable storage medium of claim 48 wherein the amount of downtime associated with the first failure event is weighted using a first weighting factor and the amount of downtime associated with the second failure event is weighted using a second weighting factor.

50. A system comprising:
a memory unit to store instructions; and
a processor to receive the instructions from the memory unit, the processor including:
a candidate design generator;
a failure event generator;
a modeling module communicatively coupled to the candidate design generator and the failure event generator, the modeling module configured to estimate an outage time and an amount of data loss for a candidate design having computer systems and storage systems; and
a penalty cost module communicatively coupled to the modeling module, the penalty cost module to determine a penalty cost associated with the estimated amount of outage time and a penalty cost associated with the estimated amount of lost data.

51. The system of claim 50 wherein the penalty cost module is also communicatively coupled to the failure event generator, the failure event generator configured to generate a weighting factor for a generated failure event.

52. The system of claim 50 further comprising:

an input for a penalty cost rate function associated with the outage time of a failure event; and an input for a penalty cost rate function associated with an amount of lost data of a failure event, each of the inputs to the penalty cost module.

53. The system of claim 51 further comprising an outlay cost module communicatively coupled to the candidate design generator, the outlay cost module configured to receive a set of configuration parameters associated with a generated candidate design, the outlay cost module configured to determine the outlay cost of the generated candidate design in response to the configuration parameters.

54. The system of claim 53 further comprising a total cost module communicatively coupled to the penalty cost module and communicatively coupled to the outlay cost module, the total cost module configured to add the penalty cost associated with outage time of a plurality of failures for a generated candidate design, the penalty cost associated with data lost based on a plurality of failures for the generated candidate design, and the outlay cost for the generated candidate design.

55. The system of claim 54 further comprising a comparator module communicatively coupled to the total cost module, the comparator module to compare a total cost of a first generated candidate design and a total cost of a second generated candidate design.

* * * * *

UNITED STATES PATENT AND TRADEMARK OFFICE
CERTIFICATE OF CORRECTION

PATENT NO. : 7,680,635 B2  Page 1 of 1
APPLICATION NO. : 10/944321
DATED : March 16, 2010
INVENTOR(S) : Kimberly Keeton et al.

It is certified that error appears in the above-identified patent and that said Letters Patent is hereby corrected as shown below:

In column 28, line 6, in Claim 15, delete "events" and insert -- events to --, therefor.

In column 29, line 8, in Claim 24, delete "23urther" and insert -- 23 further --, therefor.

In column 32, line 10, in Claim 45, delete "configuration-having" and insert -- configuration having --, therefor.

Signed and Sealed this

Thirty-first Day of August, 2010

David J. Kappos
*Director of the United States Patent and Trademark Office*